(12) United States Patent
Ayers et al.

(10) Patent No.: US 9,571,753 B2
(45) Date of Patent: Feb. 14, 2017

(54) MOBILE DEVICE FOR RECORDING, REVIEWING, AND ANALYZING VIDEO

(71) Applicant: UfaceMe, Inc., Minneapolis, MN (US)

(72) Inventors: James L. Ayers, Minneapolis, MN (US); William J. Schmidt, Minnetonka, MN (US)

(73) Assignee: UfaceMe, Inc., Minneapolis, MN (US)

( * ) Notice: Subject to any disclaimer, the term of this patent is extended or adjusted under 35 U.S.C. 154(b) by 0 days.

(21) Appl. No.: 15/041,817

(22) Filed: Feb. 11, 2016

(65) Prior Publication Data

US 2016/0165150 A1 Jun. 9, 2016

Related U.S. Application Data

(63) Continuation-in-part of application No. 14/816,608, filed on Aug. 3, 2015, now Pat. No. 9,262,539, which
(Continued)

(51) Int. Cl.

| | |
|---|---|
| *G09B 5/00* | (2006.01) |
| *H04N 5/262* | (2006.01) |
| *H04L 29/06* | (2006.01) |
| *G06F 3/0484* | (2013.01) |
| *G06F 3/0488* | (2013.01) |

(Continued)

(52) U.S. Cl.
CPC .......... *H04N 5/2624* (2013.01); *G06F 3/0488* (2013.01); *G06F 3/04842* (2013.01); *G06F 17/3028* (2013.01); *G06F 17/3053* (2013.01); *G06F 17/30867* (2013.01); *G06F 17/30991* (2013.01); *G06Q 10/101* (2013.01); *G06Q 50/01* (2013.01); *G09B 5/067* (2013.01); *G09B 19/00* (2013.01); *H04L 65/60* (2013.01); *H04L 67/10* (2013.01); *H04N 5/2254* (2013.01);
(Continued)

(58) Field of Classification Search
USPC .................................................. 434/309, 310
See application file for complete search history.

(56) References Cited

U.S. PATENT DOCUMENTS

| | | |
|---|---|---|
| 6,705,869 B2 | 3/2004 | Schwartz |
| 2005/0026121 A1 | 2/2005 | Leonhard |
| 2008/0167952 A1 | 7/2008 | Blair |

FOREIGN PATENT DOCUMENTS

| | | |
|---|---|---|
| JP | 2007257330 | 10/2007 |

OTHER PUBLICATIONS

International search report for International application No. PCT/US2012/035737, dated Nov. 26, 2012 (3 pages).
(Continued)

*Primary Examiner* — Kesha Frisby
(74) *Attorney, Agent, or Firm* — Hamre, Schumann, Mueller & Larson, P.C.

(57) ABSTRACT

Two parties have three distinct viewpoints of their relationship, from which assumptions emerge and working hypotheses about how to manage their relationship. The system, device, and method described herein include using a mobile device for understanding face-to-face human interactions. The process includes using a mobile device for recording an interaction with one or more other persons, whereby one or more of the participants use the mobile device to describe their viewpoints of the interaction. The participants can use the mobile device to receive immediate feedback for analysis, to compare viewpoints, to examine how the viewpoints are arrived, and to explore the viewpoints' consequences for the participants' relationship.

2 Claims, 32 Drawing Sheets

Related U.S. Application Data is a continuation-in-part of application No. 13/459,381, filed on Apr. 30, 2012, now Pat. No. 9,099,011.

(60) Provisional application No. 61/480,555, filed on Apr. 29, 2011.

(51) Int. Cl.

| | |
|---|---|
| *H04N 7/18* | (2006.01) |
| *G06F 17/30* | (2006.01) |
| *H04N 5/225* | (2006.01) |
| *H04N 5/232* | (2006.01) |
| *G06Q 10/10* | (2012.01) |
| *G06Q 50/00* | (2012.01) |
| *G09B 5/06* | (2006.01) |
| *G09B 19/00* | (2006.01) |
| *H04L 29/08* | (2006.01) |

(52) U.S. Cl.
CPC ....... *H04N 5/23293* (2013.01); *H04N 5/2628* (2013.01); *H04N 7/185* (2013.01)

(56) References Cited

OTHER PUBLICATIONS

Written opinion for International application No. PCT/US2012/035737, dated Nov. 26, 2012 (6 pages).

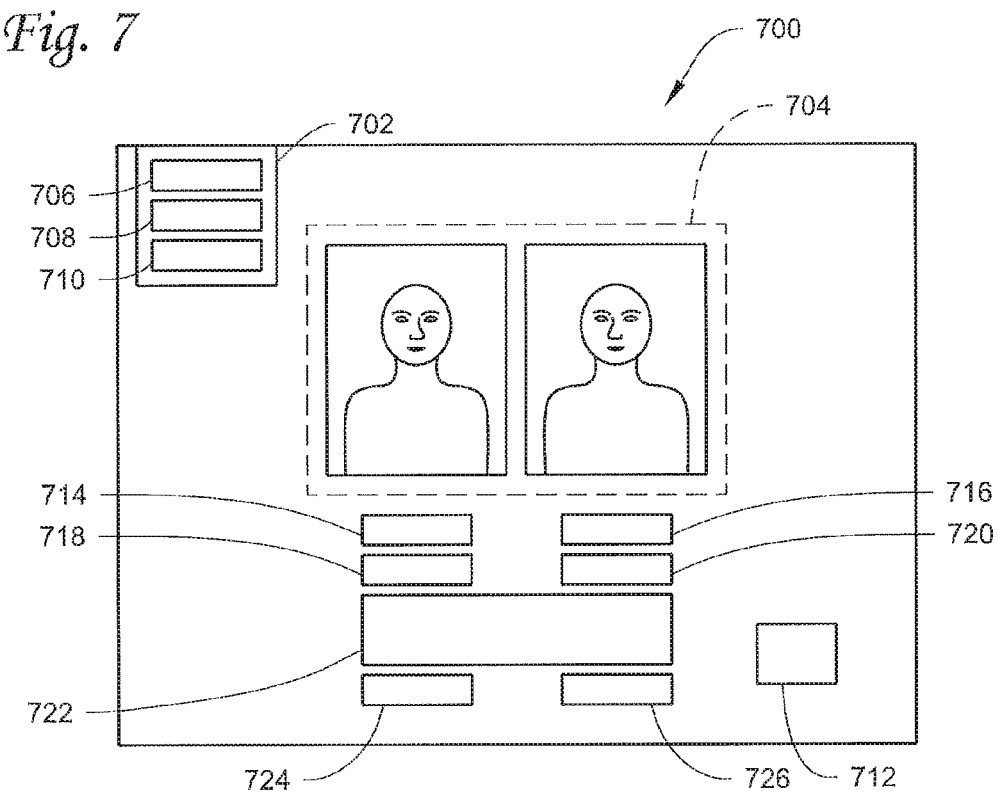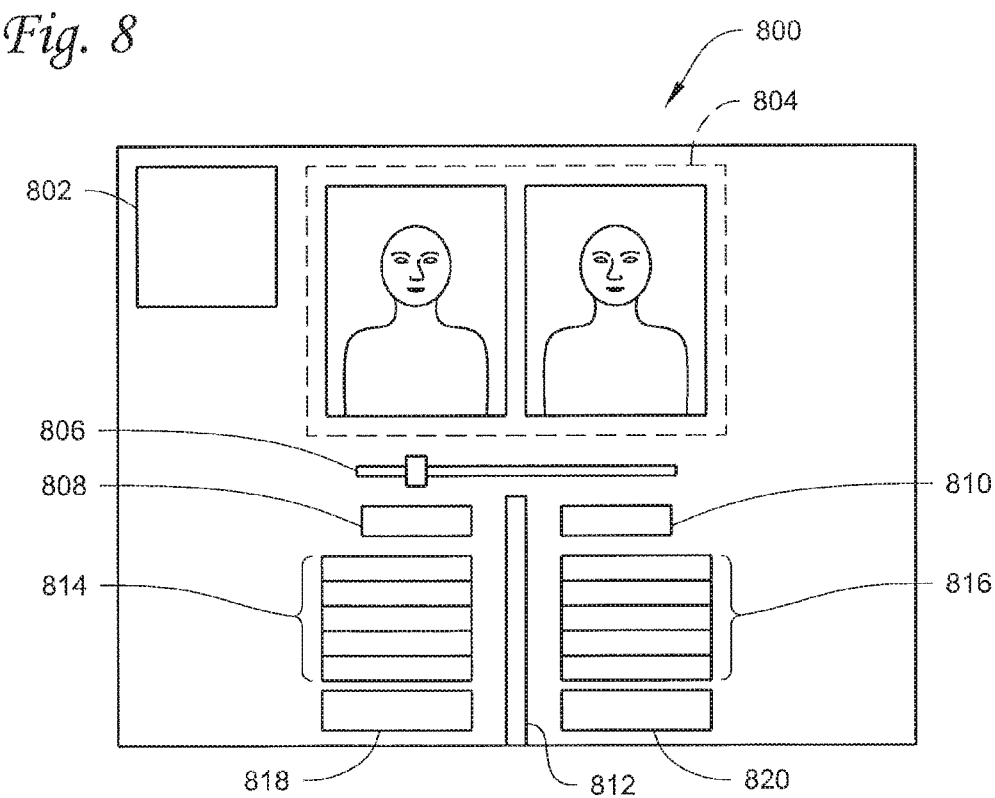

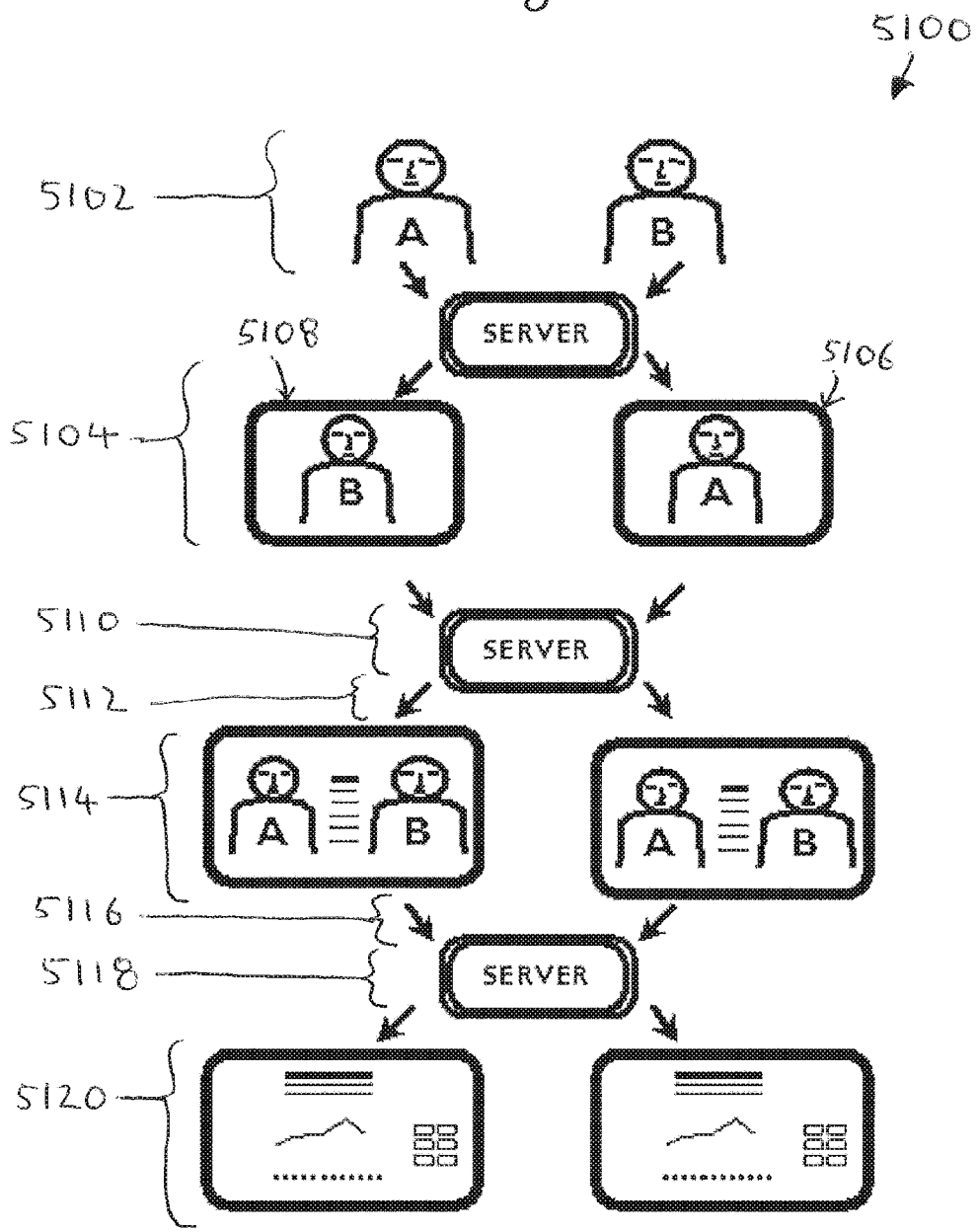

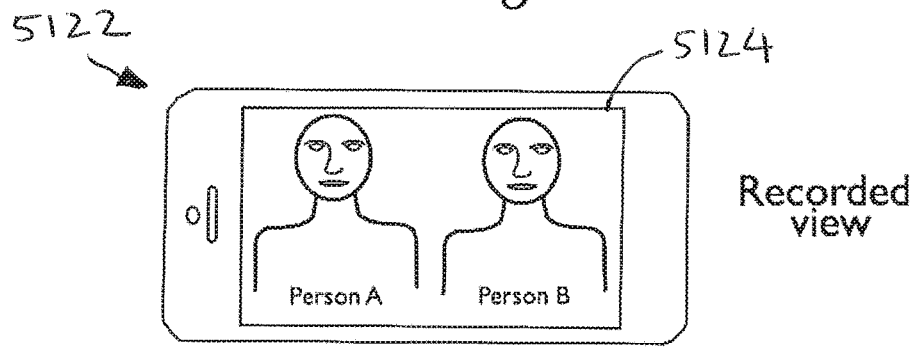
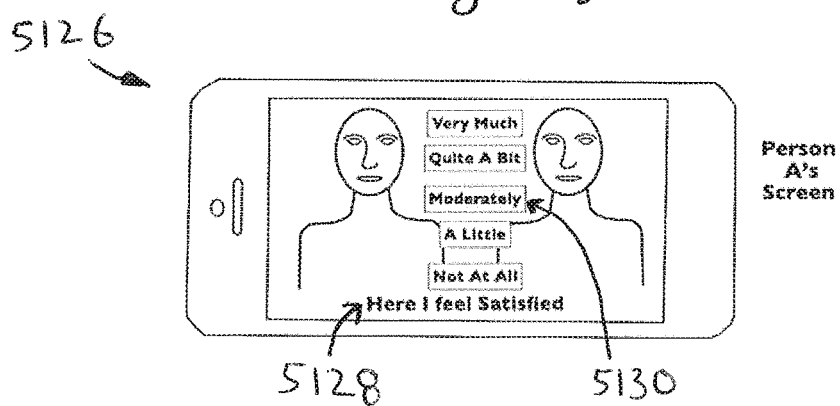
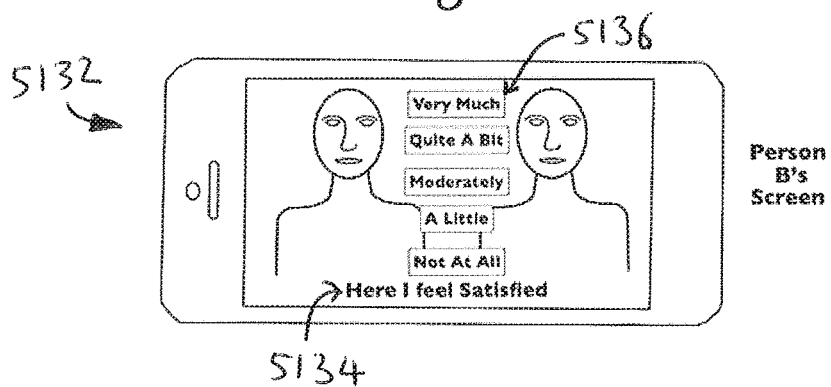

MOBILE DEVICE FOR RECORDING, REVIEWING, AND ANALYZING VIDEO

PRIORITY INFORMATION

This application claims the benefit of priority of U.S. Provisional Patent Application No. 61/480,555 filed Apr. 29, 2011 and entitled "SYSTEM, DEVICE, AND METHOD FOR RECORDING, REVIEWING, AND ANALYZING FACE-TO-FACE HUMAN INTERACTION," which is herein incorporated by reference in its entirety.

This application is related to U.S. patent application Ser. No. 13/459,381 filed Apr. 30, 2012 and entitled "LEARNING TOOL AND METHOD OF RECORDING, REVIEWING, AND ANALYZING FACE-TO-FACE HUMAN INTERACTION," having been issued as U.S. Pat. No. 9,099,011 on Aug. 4, 2015, which is herein incorporated by reference in its entirety.

This application is a continuation-in-part of U.S. patent application Ser. No. 14/816,608 filed Aug. 3, 2015 and entitled "MOBILE DEVICE AND SYSTEM FOR RECORDING, REVIEWING, AND ANALYZING HUMAN RELATIONSHIP," which is herein incorporated by reference in its entirety.

FIELD

This description relates generally to a computer implemented method, system, and device for face-to-face human interaction and analysis of the interaction.

BACKGROUND

Conventional face-to-face interaction is an interaction between two or more human beings who are physically close enough to each other so as to permit some form of mutual perceptual contact and reciprocal behavioral exchange. Such interactions are immediate and there is no barrier between the interacting parties. There is immediacy of time and proximity of space, which permits mutuality in perception and reciprocity in behaviors of both parties. Face-to-face interaction is an important phenomenon to human life because it is a conduit through which individuals influence each other in their daily lives. Face-to-face interactions are the primary experiences that form the foundation of human life.

In contrast to the conventional face-to-face interaction, conventional messaging interaction (e.g., letter writing with paper letters mailed through a postal service), is an example of an interaction where there is both a time and space barrier between participants. There are fundamental differences between the conventional face-to-face interaction and the conventional messaging interaction. The time and space barriers slow down the interaction process and the interaction proceeds in a step-wise process. For example, a message is sent from a sender to a responder, and the responder does not respond to the message until after the message has been received by the responder. The time delay between sender and responder allows the responder time to reflect on his/her response to the message. Because of the separation in time and space, the sender of a message cannot immediately monitor the impact of the message on the receiver. This type of conventional interaction can be slow and cumbersome.

The conventional messaging interaction has dominated human relationships throughout human history, and the media employed (letters, books, accounting ledgers, and documents of all kinds) generate valuable historical records. Such records not only define the relationship between parties but also how the relationship evolved. A good example of this is a correspondence between two people who exchange messages, such as letters, for a length of time. The reactions to each other's viewpoints about different issues can be examined in detail through the analysis of the written documentation in which they exchanged viewpoints. Similar time delay barriers exist when using modern technology, such as, for example, e-mail, instant messaging, texting, blogging, social network posting and responding to the posting.

BRIEF SUMMARY

Face-to-face interactions are considered to be the primary arena where people learn about each other and themselves. Learning, like face-to-face interaction, is central to human life. Learning discussed in this disclosure requires effort and observation in order for learning to actually occur. Observation is essential for learning, and the significance of the method, system, and device described herein is that it is a true learning tool. A personal relationship learning tool allows participants to become co-investigators of their relationship. Most people have been socially conditioned to fear relationship feedback, having received feedback most often when something went wrong so that feedback is usually experienced as critical, uninvited, and presented by some authority. For most people, then, feedback is anticipated to be adverse, something to be avoided at all costs, unless absolutely necessary.

The device and system described herein provide modes of human interaction mediated by technology, extending the conventional understanding of face-to-face interaction. An example includes a mobile device having a processor connected to a camera component, wherein the camera component has an aperture and a prism positioned in front of the aperture. The prism combines two images and directs the combined image to the aperture, so that the camera component receives the combined image, and a data of the combined image is transmitted to the processor. The processor can further process the combined image, if needed and/or desired, and the resulting data from the combined image data is stored to a non-transitory computer-readable memory of the mobile device. The prism can be connected to a cover of the mobile device. The cover and the mobile device can be detachable from one another. The cover can provide some protection to the mobile device as well. The cover can have a hole positioned to allow the mobile device's camera component, and specifically the aperture, to be unobstructed by the cover, and at the same time, position the prism to be in front of the aperture so that the prism combines and directs at least two images (e.g., two different images) received at respective surfaces of the prism towards the aperture of the camera component. The mobile device can receive series of images for recording a video (e.g., a combined video) onto the non-transitory computer-readable memory. An audio recording can also be made via a microphone built into the mobile device. The processor can combine the video data received via the camera component and the audio data received via the microphone to generate an audio-video (AV) data, which is then stored on the non-transitory computer-readable memory.

The mobile device can also include a network interface that is in communication with the processor. Thus, the processor of the mobile device can communicate via the network interface connecting to a network (e.g., WiFi, cellular, internet, etc.) in order to communicate with a computer server (e.g., a remote computer server). The computer server can also communicate with another mobile device (also having a camera component and a network interface), wherein the computer server combines the data exchanged between the two mobile devices and stores the combined data related to a face-to-face communication.

Accordingly, at a later time, the mobile device or another mobile device can be used to access the computer server via the respective mobile devices, and review the AV data. That is, the computer server can communicate the AV data to one or more of the mobile devices when the computer server receives a request for the AV data from one or both of the mobile devices.

The AV data can be a social event because the recording process itself is a catalyst for interpersonal processes inherent in all human relationships. Accordingly, the system that includes one or more mobile devices and the computer server is an embodiment of the learning tool. The extension of the face-to-face interaction emphasizes the core definition of the conventional face-to-face interaction, i.e. real-time mutuality and reciprocity. Even when only audio information is exchanged during the interaction, the resulting conversation could be considered to be a face-to-face interaction, because the conversation takes place in real time where both parties can speak and listen.

The computer server can provide a social networking or other relationship interface via which the face-to-face communication can be accessed via the mobile device(s). The AV (AV) data, which is a recording of the face-to-face communication between two persons, can be accessed, searched for, viewed, etc. via, for example, the social networking interface provided via the computer server or provided by a user interface (e.g., App) displayed on the mobile device.

Many internet sites, such as social networking sites (which allow communication via postings, likes, text messages, emoticons, etc.) and relationship matching services (e.g., dating sites, which include still and/or motion pictures of faces) are not interactive at the level of face-to-face interaction because the person being observed is not also observing the observer in real time. This distinction is relevant here because the product described here is applicable to all forms of human face-to-face interaction, regardless of the physical location of the participants. Physical proximity is not considered essential to the definition of face-to-face interaction as used herein, but real-time mutuality and reciprocity is. Where the participants are remotely located from each other but having an interaction with real-time immediacy is included in the meaning of the face-to-face interaction as used herein.

Face-to-face interaction requires at least two participants. Face-to-face interaction can include more than two participants. The embodiments of the process, system, and device disclosed here in are designed to be applicable to all forms of face-to-face interaction, regardless of the number of participants and/or regardless of their physical proximity. For easier understanding, the embodiments herein describe two-person or dyadic application. Applying the principles described to a group face-to-face interaction is the same method and/or product extended to accommodate more parties.

An embodiment of system includes a computer server having a processor, a network interface, and a non-transitory computer-readable memory for storing one or more AV recording of a face-to-face interaction between at least two people. The system also includes at least one mobile device.

The mobile device obtains video data of a substantially face-on first image of a first person and another video data of a substantially face-on second image of a second person, and a prism of the mobile device combines the two video data to generate a combined video data. The combined video data is combined with a recorded audio data by the mobile device to generate an AV data. The mobile device communicates the AV data to the computer server. The computer server stores the AV data in the non-transitory computer-readable memory. The computer server can provide searchable and indexed access to the AV data, and also to other AV data if they exist, by using the mobile device. For example, the mobile device can be used to access to view and listen to the AV data. The AV data is displayed on the mobile device with the two face-on images of the first person and the second person being side by side.

The mobile device is configured to aid in analyzing the AV data by playing the AV data. During the playing of the AV data by the mobile device, the mobile device provides, at a moment of the AV data, a first query statement (e.g., as a part of a first series of queries) to the first person. During the playing of the AV data by another mobile device, the another mobile device provides, at a moment of the AV data, a second query statement (e.g., as a part of a second series of queries) to the second person. Thus, different query statements can be displayed on the respective mobile devices.

Thus, what can be considered to be a first ranking device is the first mobile device in communication with the computer server, which allows the first person to provide a first rank to the first query statement. Further, what can be considered to be a second ranking device is the second mobile device in communication with the computer server, which allows the second person to provide a second rank to the second query statement.

The computer server receives the first rank and the second rank, and stores the first rank and the second rank as a comparative rank data as a function of time of the AV data in the non-transitory computer-readable memory. The computer server can communicate the comparative rank data to one or more of the mobile devices, and the one or more mobile devices can display the comparative rank data as the function of time of the AV data. This allows displaying of periods of similarities and differences of the first rank and the second rank along the time axis of the AV data (i.e., during the face-to-face interaction between the first and second persons), so that the periods of similarities and differences can be observed and discussed by the first and second persons, becoming points of learning to first and second persons.

In another embodiment, the mobile device includes an interface, displayed on a display device of the mobile device. The interface includes an image that shows at least a portion of the substantially face-on first image and at least a portion of the substantially face-on second image, and a graph showing a comparison of the comparative rank data as a function of time, a dynamic synchronization of the image with a slider control which can be moved along an axis of a time graph, wherein the comparison of the comparative rank data and the third image are displayed synchronized together.

In another embodiment, the review interface includes a bar comparison of averages of the comparison of the comparative rank data for the time graph.

Another embodiment includes a ranking system displayed on the mobile device, which allows either the first person or the second person to independently provide a rank to a query statement displayed on the mobile device with respect to the AV data being played on the display screen of the mobile device. The review interface displays the rank as a function of time of the AV data, which shows periods of similarities and differences of the rank, wherein the periods of similarities and differences to be observed and discussed becoming points of learning to the first or the second persons. The embodiment further includes a camera and/or microphone for obtaining a video and/or audio data of the first or the second person during the displaying of the rank as the function of time of the AV data.

In another embodiment, the query statement includes a request to assume a viewpoint. In another embodiment, the viewpoint can be one of a self-view, an other-view, and a social view. In another embodiment, the query statement includes a statement to consider when creating the first and second rankings. In another embodiment, the query statement includes a statement to consider when creating the first and second rankings. In another embodiment, the query statement includes a viewpoint which could be one of a self-view, an other view, and a social view, and the query statement also includes a statement with respect to the viewpoint, said method further comprises changing the query statement a plurality of times during the playing at least the portion of the AV data.

In another embodiment, a non-transitory computer-readable storage memory stores a set of instructions which when executed by a computer system implement a method for analyzing data gathered by a mobile device. The mobile device includes a data gathering system that gathers data about persons during a conversation among them and the computer system connected to the data gathering system for receiving the data and storing.

The mobile device can display, on a display screen of the mobile device, a ranking system which allows at least some of the persons to independently rank first and second query statements with respect to the conversation. The embodiment of the method comprises playing the stored data with the mobile device to allow one of the persons to rank a first query statement with the ranking system to obtain a first ranking, while a second mobile device allows another of the persons to rank a second query statement with the ranking system to obtain a second ranking. The computer server receives both of the first ranking and the second ranking and creates a comparison as a function of time of the first and second rankings relative to the conversation among the persons (e.g., the AV data), and displays on display(s) of one or both of the mobile devices the comparison as a function of time of the first and second rankings relative to the conversation among the persons (e.g., the AV data). Thus, periods of similarities and differences between the first and second rankings can be observed and discussed, which become points of learning.

In another embodiment, the computer server includes a non-transitory computer-readable memory which stores a plurality of the AV data and associated ranking data file(s). The computer server is configured to be accessible by one or more mobile devices via a network, and provide to the mobile devices an indexed listing of the AV data and the associated ranking data file(s). When one or more of the mobile devices sends a request to the computer server for a particular one of the AV data and/or the associated ranking data file(s), the computer server transmits the requested data files to the mobile device from which the data request has been made. The mobile device can then display on its display device, the AV data and the associated ranking data from the received files. During the displaying of the AV data and the associated ranking data on the mobile device, the mobile device can be used to add additional comments (e.g., via audio using a microphone of the mobile device) regarding the files, which is communicated to the computer server via the network. The computer server receives the comments and stores the comments as additional data (i.e. comment data) that are associated with the respective AV data and the associated ranking data file(s). The comment data can include time data so that the comment data is associated with a particular time point(s) of the AV data, so that when the AV data is viewed, the comment data can be played at particular moments in time of the AV data that the comment is associated with. The comments can be observed and discussed, by the person who made the comment or by others (e.g., the other participant in the conversation of the AV data) which become points of learning.

BRIEF DESCRIPTION OF THE DRAWINGS

FIG. 7 shows an embodiment of a user interface.
FIG. 8 shows an embodiment of a user interface.
FIG. 24 shows an example flow chart of a method for using the learning tool system shown in FIG. 23.
FIG. 25 shows an example of a mobile device displaying an AV data.
FIG. 26A shows an example of a first mobile device displaying an AV data and a user interface.
FIG. 26B shows an example of a second mobile device displaying an AV data and a user interface.

DETAILED DESCRIPTION

Figure 1:
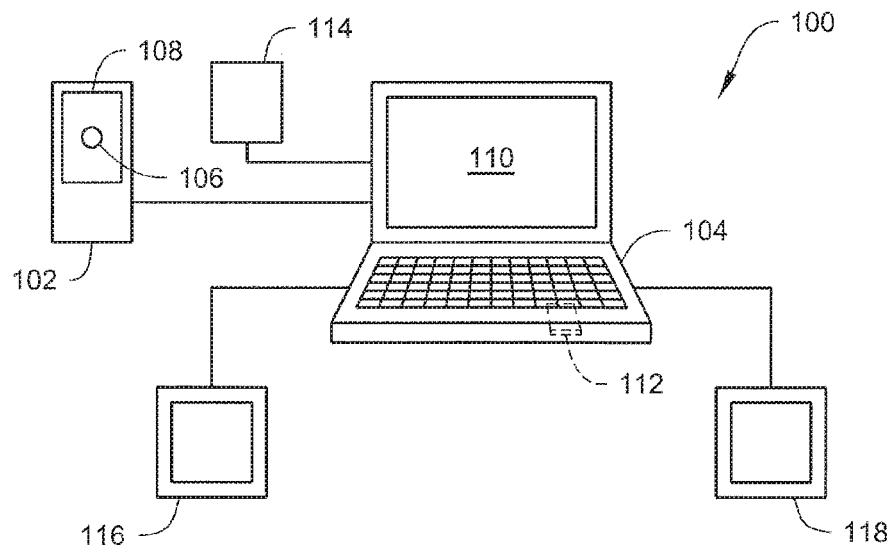
FIG. 1 shows a schematic view of an embodiment of a learning tool.

FIG. 1 shows schematic view of a personal relationship learning tool 100 including a camera system 102 in communication with a computer system 104. The camera system 102 includes at least one camera 106 having an aperture 108. The camera system 102 is configured to send an image data from the camera system 102 to the computer system 104. The camera system 102 is configured to obtain a video data of a substantially face-on first image of the first person and a substantially face-on second image of the second person during a face-to-face conversation between the first and second persons. The computer system 104 includes a display device 110 for displaying an interface for one or more users to interact with the learning tool 100. The interface displayed on the display device 110 may be one or more of the interfaces described more in detail below, and shown in FIGS. 7-11 and 14-19. The computer system 104 further includes a non-transitory computer-readable memory device 112 for storing one or more data files. The learning tool 100 includes an audio recording system 114 to obtain audio data of the face-to-face conversation audio of the first and second persons during the face-to-face conversation between the first and second persons. The audio recording system includes a microphone for recording audio. The computer system 104 receives the video data and the audio data, combines the video data and the audio data to form an AV data, and stores the AV data. The computer system is configured to aid in analyzing the AV data by playing the AV data and displaying the video of the AV data on the display device 110. During the playing of the video of the AV data, the computer system 104 can display, at predetermined or random moment during the playtime of the AV data, one or more query statements via the interface shown on the display device 110. The learning tool 100 includes one or more ranking devices 116, 118. FIG. 1 shows a first ranking device 116 that is connected to the computer system 104, which allows the first person to provide a first rank to a first query statement displayed via the interface shown on the display device 110. A second ranking device 118 is connected to the computer system 104, which allows the second person, independent of the first person, to provide a second rank to a second query statement displayed via the interface shown on the display device 110. The computer system 104 is configured to receive and receives the first rank and the second rank. The computer system 104 then stores the first rank and the second rank as a comparative rank data to the non-transitory computer-readable memory device 112. The computer system 104 displays on the display device 110 via the interface, a comparative rank data as a function of time of the AV data, which shows periods of similarities and differences of the first rank and the second rank, wherein the periods of similarities and differences can be observed and discussed, thereby becoming points of learning to the people who were the participants of the recorded face-to-face interaction.

The learning tool 100 can be used for recording primarily the sound of the face-to-face interaction. Recording the sound from the face-to-face interaction provides some data for review and analysis. A function of the audio recording is to act as a stimulus for at least one participant's recall of the face-to-face interaction during the recall process. Accordingly, the recall process can include using the audio only recorded data. A feature of the recall process using only the audio recording is that whatever is recorded can prompt the participant to recall and also serves as a reference point in real time so that query statements can be presented in a structured manner so that the participants can respond at the same points in real time. Thus, the method disclosed herein could be applied to a recorded telephone conversation, Voice Over Internet Protocol (VOIP) conversation, etc. The method includes recording the conversation of at least two participants who may be in separate physical locations. A VOIP implementation can require that each participant use a computer system configured for VOIP and a memory storage memory onto which the recorded conversation is stored.

In another embodiment, the non-transitory computer-readable memory device 112 is a non-transitory computer-readable storage memory which stores a set of instructions which when executed by the computer system 104 implement a method for analyzing data gathered by the personal relationship learning tool 100. The tool 100 includes a data gathering system which includes the camera system 102 and the audio recording system 114. The data gathering system gathers data about persons during a conversation among them. The computer system 104 is connected to the data gathering system 102, 114 for receiving the data and storing the data. The tool 100 further includes a ranking system 116, 118, which allows at least some of the persons to independently rank first and second query statements with respect to the conversation. The embodiment of the method comprises playing the stored data with the computer system 104 to allow one of the persons to rank a first query statement with the ranking system 116 to obtain a first ranking and to allow another of the persons to rank a second query statement with the ranking system 118 to obtain a second ranking, creating with the computer system 104 a comparison as a function of time of the first and second rankings relative to the conversation among the persons, and displaying with the computer system 104 the comparison as a function of time of the first and second rankings relative to the conversation among the persons, wherein periods of similarities and differences between the first and second rankings can be observed and discussed, which then become points of learning.

In another embodiment, the non-transitory computer-readable memory device 112 is a non-transitory computer-readable storage memory which comprises a stored AV data and a stored associated ranking data file, wherein the stored AV data and the stored associated ranking data file have been gathered about persons during a conversation among them by using the learning tool 100 which includes the computer system 104 connected to a data gathering system 116, 118 for receiving AV data and storing the AV data as the stored AV data by the computer system 104. The learning tool 100 further includes the ranking system 116, 118 which allows at least some of the persons to independently rank first and second query statements with respect to the conversation which is stored as the stored associated ranking data file by the computer system 104.

Figure 2:
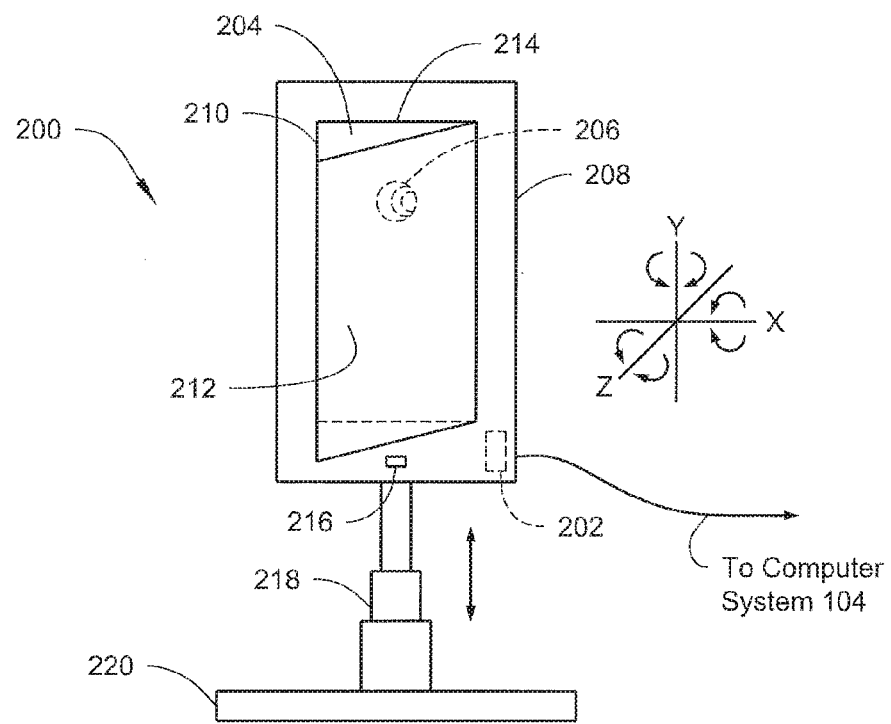
FIG. 2 shows an embodiment of a camera system.

FIG. 2 shows an embodiment of a camera system 200 configured with a communication component 202 configured for sending image data to a computer system 104. It can be preferable for the camera system 200 to be capable of high quality digital recording at various lighting conditions. The camera system 200 includes a prism 204 configured in front of an aperture 206 of a camera 208. The prism 204 has a first surface 210, a second surface 212, and an aperture surface 214. The aperture surface 214 faces the aperture 206. A first image that is received at the first surface 210 of the prism 204 is directed (i.e., refracted and/or reflected) towards the aperture 206 and passes through the aperture surface 214. A second image received at the second surface 212 is directed (i.e., refracted and/or reflected) towards the aperture 206 and passes through the aperture surface 214. Thus the prism 204 can combine the first and second images such that the aperture 206 receives the combined image. The combined image is sent to a computer system 104 via the communication component 202.

The camera system 200 can also include the audio system, such as a microphone 216 for capturing the audio data. The audio data is combined with the combined video data as an AV data and sent to the computer system via the communication component 202. Alternatively, the audio data is sent as a separate data from the video data, and both the audio data and the video data are sent to the computer system via the communication component 202 as separate data. The computer system then can combine the audio data and the video data for creating the AV data. The camera system 200 can include a stand 218 and a base 220. The stand 218 can be a telescoping tube that is configured for changing the height of the camera system 200.

The prism 204 can be an optical quality prism. The prism 204 has internal angles appropriate for capturing images of participants and for refracting the images to form a combined image towards the aperture surface 214 for sending the combined image to the aperture 206 of the camera 208. An embodiment of the prism 204 is an equilateral prism having 60° for each internal angle of the prism 204. For the equilateral prism, the camera system 200 should be positioned midway between the participants at their eye level about 12 inches away from the axis of interaction. The participants are seated, about 2-4 feet apart, facing each other. As participants look directly at each other, each should be able to see the camera system 200 on the periphery of their field of view. The camera system 200 may be connected to the computer system through the USB port. The camera system 200 is configured to be adjusted for height and for tilt to accommodate participants who might be of different heights. The prism 204 optically reverses the images of each person, left to right, just as it would be if they were seeing themselves in a mirror.

Figure 3:
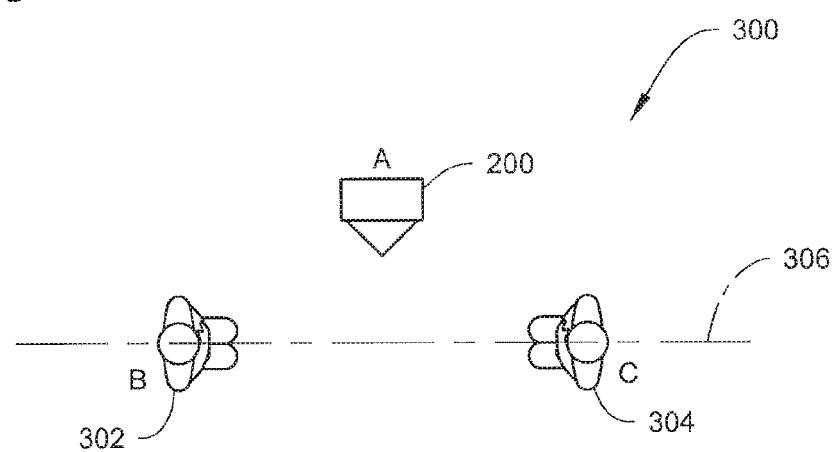
FIG. 3 shows example positions of participants and a camera system.

FIG. 3 show an example of positioning 300 for the camera system 200 and two participants 302, 304. The camera system 200 is placed at position A, two participants 302, 304 at positions B and C, respectively, for engaging in a social interaction, e.g., face-to-face interaction. The two participants 302, 304 face each other along an axis of the interaction 306. The camera system 200 placed at position A is not on the axis of the interaction 306 defined by first person's position B and second person's position C. However, the camera system 200 can capture substantially face-on images of the participants 302, 304, such that facial expressions of the participants 302, 304, such as, eye movement, and/or eye contact between the participants can be recorded. Such information replicates what was available in the face-to-face interaction and stimulates greater recall for the participants. The camera system 200 can be in plain view to both participants.

In another embodiment, the camera system can include at least two cameras, each of the cameras respectively provided to capture substantially face-on images of the participants. An example of such embodiment of the camera system may use a mobile computer system having a digital camera and a microphone. Each camera would record the face-on image of the participants. Then, the recorded video images are cropped, accomplished through a computer software and/or hardware within the mobile computer system and/or a remote computer system that receives the images from the cameras.

Once the face-to-face interaction is finished and the interaction is recorded to a non-transitory computer-readable memory, to a local storage and/or to a remote server's memory, the parties would then proceed to a Reviewing Stage. The Reviewing Stage includes playback of the recorded composite images and/or video for viewing by both parties.

Figure 4:
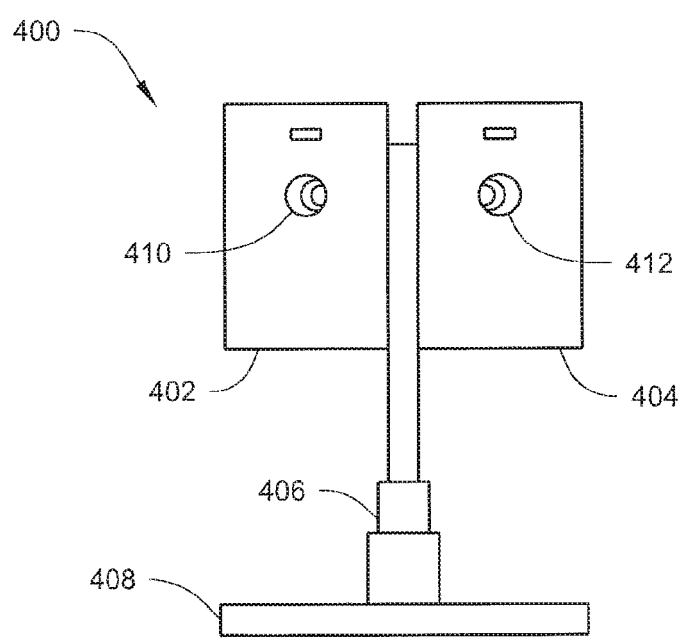
FIG. 4 shows another embodiment of a camera system.

FIG. 4 shows another embodiment of a camera system 400 having a first camera 402 and a second camera 404 connected to a stand 406 and a base 408. The first camera 402 has a first aperture 410 for receiving a first image. The second camera 404 has a second aperture 412 for receiving a second image. The stand 406 is configured to be height adjustable by having a telescoping tube configuration. The first camera 402 has a first view angle, and the second camera 404 has a second view angle. The first camera 402 and the second camera 404 are pivotable and configurable up-and-down, and/or side-to-side. The first camera 402 sends the first image data to a computer system or a video mixer unit. The second camera 404 sends the second image data to the computer system or the video mixer unit. If the video mixer unit receives the first image data and the second image data, the video mixer unit combines at least a portion of the first image data and at least a portion of the second image data to generate a combined image data, and sends the combined image data to the computer system. If the computer system receives the first image data and the second image data, the computer system uses a software method to combine at least a portion of the first image data and at least a portion of the second image data to generate the combined image data. The camera system 400 having the two cameras 402, 404 mounted together can be placed somewhere near the participants. The two cameras 402, 404 can be positioned close to the axis of interaction so that they do not interfere with the sight line between the participants yet capture substantially face-on views of each person. For example, the camera system 400 can be positioned midway between the participants at their eye level about 12 inches away from the axis of interaction. The participants are seated, about 2-4 feet apart, facing each other. As participants look directly at each other, each should be able to see the camera system 400 in their field of view. In another configuration, the camera system is configured to combine signals from the cameras 402, 404 into a single composite images and/or video, transmit the composite images and/or video to a computer system and/or remote server for storage to a non-transitory computer-readable memory. The composite image is stored to the non-transitory computer-readable memory as a digital file and edited so that, when played back, the playback video of the digital file shows each person similar to or as he/she was actually seen by the other person without the images being reversed or mirror images thereof.

Figure 5:
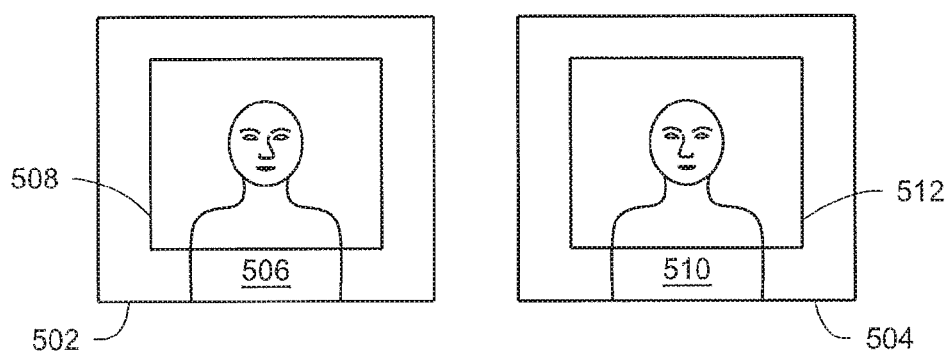
FIG. 5 shows an embodiment of face-on images.

FIG. 5 shows a first image 502 captured by the first camera and a second image 504 captured by the second camera of the camera system 400. The images 502, 504 shown are prior to the images being combined to generate a single composite image and/or video file, for example by a mixer unit, a computer system, and/or a remote server. The first image 502 captured by the first camera shows a substantially face-on image of a first person 506 and first image border area 508 that a mixer unit determines as the crop region for generating the single composite image and/or video file. The second image 504 captured by the second camera shows a substantially face-on image of a second person 510 and a second image border area 512 that a mixer unit determines as the crop region for generating the single composite image and/or video file.

Figure 6:
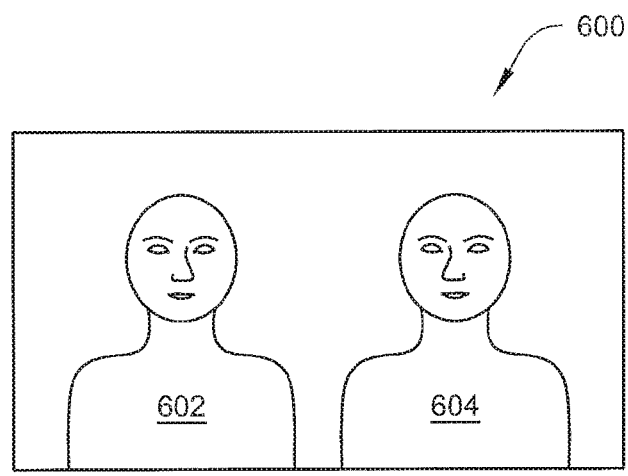
FIG. 6 shows an embodiment of a combined image.

FIG. 6 shows an embodiment of a video recording image 600 of two persons' 602, 604 face-to-face interaction. The image 600 can be achieved by using the camera systems 200, 400 described above. Note that both people 602, 604 shown in the image 600 are substantially face-on, which means that they are recorded close to the angle from which each was viewed by the other person. Thus, during a video playback, the participants see the other as well as his or her facial image. The video recording image 600 may include frames and/or borders to dress up the image 600, such as for example, an interface having a border displayed over the image 600 between the two people 602, 604.

A single composite image combined from a plurality of images from a combination of the embodiments of the camera system with more than two people participating in a face-to-face interaction is also possible. Recording the interaction of more than two people is similar to recording two persons, i.e. along the interaction axis of the participants. The participants should remain stationary, either sitting in a circle or on both sides of a table. Two cameras can be positioned to shoot over the heads of the participants on each side, and the separate video signals can be combined in a video mixer to form a composite video image.

Examples of a computer system in accordance with the present invention include one or more of a desktop computer, laptop computer, a mobile device (e.g., a tablet, a mobile phone, mobile personal entertainment device, cloud computing device, etc.). An example mobile device can be, for example, an ebook, a tablet (e.g., iPod®, iPad®, etc.) a smart phone (e.g., Android® phone, iPhone®, etc.), etc. The mobile device includes a non-transitory computer-readable memory for storing computer instructions that store a computer product and/or a user interface instructions for recording, reviewing, and analyzing, which could be carried out on each unit separately or in conjunction with a server. The advantage of such instrumentation is its simplicity and flexibility, allowing it to be used in various settings. For example, the tablet device having a touch screen, the controls can be provided via software and displayed as a user interface. The mobile computer system can include a camera, a sound input, and a sound output. The mobile device can connect via a wireless network, such as WiFi, cellular, 3G, 4G, etc., to receive downloads of data and transmit data via the internet to a remote server. The mobile device can be configured to be fully operable without any connection to the internet or a network, providing security and capacity to protect privacy, which in some settings would be most critical. This means that the participants themselves have total control over all stages of the process and over any distribution of recordings and data. Examples of such an application include legal/forensic settings, chemical dependency and psychiatric treatment settings, military settings, and business settings requiring private collaborations.

A non-transitory computer-readable memory can provide a virtual computer system which converts almost any computer system into an operational instrument for the method described herein, by means of a flash drive containing all necessary software. For security, the flash drive could have its own security lock (such as the fingerprint of the user) in order to operate. When inserted into a computer system the flash drive downloads the computer instructions for the methods described herein, executes the computer instructions, and stores the recorded conversations and collected data. The advantage of this system is its flexibility without compromising security. However, it may be restricted in memory size and access to software updates.

The user interface can be a part of a social networking web interface and/or application. The video files are stored in a remote server, cataloged and readily reviewable by the parties who are the participants. The video file may be shared with others with permission from one or more of the participants. The video file may be shared with others when only all of the participants provide permission for sharing. The cataloged and stored video files at a remote server provides a secure recording of a face-to-face interaction. The system also provides for a participating and recording a face-to-face interaction when using a computer system that is publicly shared, such as those at a public library, workplace, and/or coffee shops. Further, because each file is a record of a particular interaction, the participants can readily review the face-to-face interaction again and again, and even append the file to continue the interaction from where the conversation ended. Thus, the system provides for a chain of face-to-face interactions to be stored, cataloged, and searchable for the convenience of the participants and/or reviewer. Further, the analysis stage that is performed by the system can provide valuable information about the relationship between the participants. In the modern social networking and social sharing age, such analysis can be extremely valuable and entertaining.

An embodiment of an interface is presented in detail in FIGS. 7-15 to illustrate how the review strategy and structure according the learning tool are implemented.

FIG. 7 shows an embodiment of a user interface 700 displayed on a display of a computer system. The user interface 700 shown is for implementing Stage 1, or the Recording Stage. A participant accesses his/her account by entering their identification information that is associated with the recorded data and/or user account. The user interface includes a dropdown menu 702 that presents choices for recording a new conversation, accessing a previously recorded video, or feedback analyses for a session, or exiting the system. The video display portion 704 shows an example video of two participants as it would appear when they are conversing, but it would not be present until the participants activate and/or set up the camera system. In this example, the interface 700 provides a border over the video image that divides the image such that each person is shown in what appears to be separate windows. The menu 702 has a preview button 706 which, when clicked, turns on the camera system so the participants can position themselves and the camera system suitably so both of the participants will always be on camera during the recording. The menu 702 has a capture button 708 which, when clicked, starts the recording process. The recording video continues to be displayed on the screen, and the participants can tilt the computer display downwards so they are not distracted by it. First time participants may not want to have the video recording screen visible as they converse. Persons who have had little or no experience with being video recorded often report feeling self-conscious, especially if their previous experiences have been unpleasant. However, once they become engaged in their conversation, participants typically report they ignore recording apparatus and video screen. The menu 702 includes a stop button 710 which, when clicked, stops the recording process and moves the participants on to Stage 2 and changes the interface to the interface shown in FIG. 8 (described in detail below). The length of the conversation is usually determined by the participants themselves, but it could be preset by the participants or an administrator who agreed on a specific time limit before their conversation. One determining factor for the length of the conversation is the time necessary to view it and receive feedback analyses of their results. Typically, a conversation of about 20 minutes allows for completion of all three steps within an hour. The participants determine who stops the conversation.

If there are external devices connected to the computer system, there are window displays 712 that allow the external devices, such as external video and/or audio devices to be used for the interactive session, for example, if an external camera plugged into a USB port of the computer system is to be used and not be the webcam internal to the computer system. However, under some conditions participants might choose to use the internal camera system with a prism. Window 714 displays the identification information, such as the first name of the first participant. Window 716 displays the identification information, such as the first name of the second participant. These windows 714, 716 display the identification information of each participant, with the left-right position being consistent with their position on the video display portion 704. The position selection windows 718, 720, when clicked, establish which person is seated on the left or right, not only as they are seated before the computer system but also on the video recording screen. The participants may select their names from the menu of users 722 displayed at the bottom of the user interface 700. The menu of users 722 displays participants and information. The actual identifying information gathered from participants can vary, depending on the application, whether it is for personal use, teaching, research, or some specific service such as counseling, sales, or coaching. Each participant, however, can be assigned a unique identification number. The Add Name button 724 allows a participant to enter their identification information into the menu of users 722. The Update button 726 permits a participant who has already entered information into the menu of users 722 to modify and update their entered data.

As an example, a conversation may include some purpose and agenda agreed upon by the participants, especially when there is some service being provided by one participant to the other, such as in health services, sales services and training services, and business services. The face-to-face interactions in different settings with different agendas, standards of practice, etc. are understandably quite different, but a premise of the empirical method is that there are always common elements and viewpoints which the participants themselves can observe and report. Also, even within a conversation with clearly agreed upon goals and agenda, as participants interact they make decisions about how to proceed in accomplishing an agenda. With these considerations in mind, it is important to note that the procedure does not require any specific agenda or topic of conversation. Indeed, from the empirical perspective of the process, the topic or agenda of the conversation can be deemed irrelevant. Participants can talk about anything, anyway they choose, whatever their viewpoints of each other, because the process focuses not so much on what they do face to face but on how they view what they do. It is their viewpoints of themselves and each other that matters, and the method and the learning tool described herein allow the participants themselves to define and report their viewpoints in an empirical fashion, wherein their viewpoints are anchored in observable events of which both participants are not only observing but also being observed. The conversation ends at a predetermined time agreed on by the participants or they may decide when they have spoken long enough. The recording ends when they click on the Stop button 710. It is also possible that during the course of their conversation they may be interrupted (e.g., an unexpected telephone call, a bathroom break, etc.), in which case they can pause the recording process and resume after the break. Typically, however, the conversation proceeds without interruption and when participants stop the recording process, they can move on to Stage 2, the Reviewing Stage.

FIG. 8 shows an example user interface 800 for the Reviewing Stage. The Reviewing Stage may include one or more of the following procedures.

1. Establishing a location for suitable viewing and responding to a recorded conversation;
2. Selecting which recorded conversation to view;
3. Positioning of participants relative to the computer system;
4. Placing vertical blinder on computer system screen if necessary;
5. Plugging in wearing headphones if necessary;
6. Practicing with apparatus (optional);
7. Starting the video playback;
8. Responding to query statements;
9. Pausing the viewing process if unexpected interruptions occur;
10. Variations in how and when the viewing takes place; and/or
11. Variations in types of response apparatus.

Establishing a location for suitable viewing and responding to the recorded conversation is similar to establishing the location for a private, uninterrupted conversation. Stage 2 requires the formation of a setting where viewing can be done in privacy and without interruptions. A private room without visual distractions or background noises may be preferable, such as in an office, living room, kitchen or possibly seating in a vehicle. Participants should have adequate seating to relax and focus on the task at hand. Yet, in certain circumstances, it might be preferable for participants to view and respond in a large room where other people are present and talking. In such a case, the participants can seat themselves with their backs to a wall and place the computer system on a table facing them. Both of them would wear headphones to hear the soundtrack of their conversation. Participants need to be attentive to time available to them for viewing, since viewing and responding requires a few minutes more than the length of the conversation itself.

When participants move directly to Stage 2 after completing Stage 1, they will not need to choose which recorded conversation to view. On the other hand, it is possible for them to start with Stage 2 after a period of time has passed. For Stage 2, the user interface allows the participant to select and access the desired AV data for playback and to perform the Review Stage.

The interface 800 has a data file window 802 listing the various recorded conversations as a selectable data listing. Each conversation data file is labeled with the date and identification information of the participants. The data file window 802 is configured to allow the data to be searchable, organizable, and/or selectable for accessing the data via the user interface. The playback screen display 804 shows the video file being played back, with both participants, each viewed from the perspective of the other person. Once the participants start the viewing process, the video recording plays back preferably nonstop. The nonstop playback allows for review data to be gathered in real time. The video control slider bar 806 may be provided to indicate which point in time the recorded video is being shown. The identification windows 808, 810 display the identification information of each participant, with the left-right position being consistent with their position on the playback screen display 804.

When the user interface 800 is being shared by both participants during the Review Stage, a screen divider 812 preferably is placed on the lower half of the computer system screen so that each person can view only his/her lower section of the computer system screen where both query statements and response choices are presented. The function of the screen divider 812 is to provide query statements to and responses from each participant, which are fully independent so that their observations are empirical and unbiased. Response choices windows 814, 816 are presented to each participant.

The wording and number of choices (ranks) of the response choices can vary to accommodate different applications, and the response options represent a range of choices from low to high, from which a participant can select. Also, the response choices do not change while participants are viewing their conversation in order to provide consistency over time, a feature that permits participants to assess changes over the course of their conversation. Response choices windows 814, 816 show five response choices ranging from "Not At All" to "Very Much." Each participant can select a response choice. The chosen response is highlighted in a color specific to each participant (e.g., red, green, etc.). Participants may change their response choice as long as the query statement is on the screen. It is possible for a participant to make no response to a query statement by not selecting on one of the options while the query statement is being presented. An embodiment of the user interface 800 presents query statements preferably for ten seconds with a five-second latency or pause period between query statements. When a participant does not respond to a query statement, this is also considered to be relevant information, such as, for example: 1) the participant doesn't have enough time to respond, 2) the participant became involved in the recorded conversation and forgot to respond, or 3) the participant is not responding at all, possibly not even attending to the video recording. Query statement Windows 818, 820 display the specific query statements, one to each participant. The user interface 800 shows one dimension of affect, "Confused," being queried at the same instant from both participants but from two different viewpoints. Mary on the left side is reporting she feels "A Little Confused," and her partner, John, on the right side, is reporting she seems to be "Not At All Confused." Thus, the Self-View of one participant can be compared later with the partner's Other-View in the Analysis Stage from the data entered by the participants during the Reviewing Stage.

The user interface 800 includes a viewing process that permits a number of variations as to when, how, and by whom Stage 2 is completed. These options include, but are not limited to the following.

1. The viewing process can be paused by the participants and can be resumed.
2. The participants may decide to view only a portion of their conversation or all of their conversation.
3. The participants could take a break after Stage 1 (Recording) and continue with Stage 2 at a later time.
4. The participants could take turns completing Stage 2, and their separate data files combined for Stage 3 feedback which they could discuss together or at a later time.
5. The same video recording could be viewed by observers other than the participants on the recording. In such cases the query statements could be identical to those given the original participants or an entirely different set of query statements. The method, system, and device described herein allows for a great deal of flexibility for such purposes as intervention, training, and research in such diverse settings as health services, sales, business, and education. For example, medical students in a class on interviewing could view a recording of their instructor interviewing a patient, and as they watch, they are also presented with the same query statements answered by the patient, and each student attempts to identify how the patient responded. Students respond on handheld wireless units, and their responses are compared with the responses of the patient. Whatever the variations, there is a consistent linking between a particular face-to-face recorded event and a particular set of query statements.

Several kinds of data are collected as participants are responding to query statements. The response to each query statement is recorded to the memory of a computer system and/or server, including no response to a query statement. A no response to a query statement is considered relevant information which the participants themselves could clarify. The query statements are displayed on the screen for a limited time, e.g., 10 seconds with a 5-seconds pause between query statements, and are presented at a regular cadence, e.g., every 15 seconds. The regular cadence helps the participants habituate to the response task and does not change regardless of what happened in the face-to-face interaction. The response time for each query statement is also recorded, and this is calculated by the time between onset of a query statement presentation and the final response choice before the end of the presentation time. Response times are considered to be valuable information in assessing not only the ability of a participant to complete the task but also identify task complexity. Other forms of data collection are also possible. For example, participants could wear a finger clip that would monitor heart rate and galvanic skin response during their face-to-face interaction in Stage 1 and as they are completing Stage 2. Participants may have physiological reactions when they are actually conversing and when they are viewing their conversation, and the physiological measures may correlate with the responses to query statements. Data is gathered in real time directly from the participants themselves in an efficient, systematic way that is relevant to how the participants understand and relate to each other.

Figure 9A:
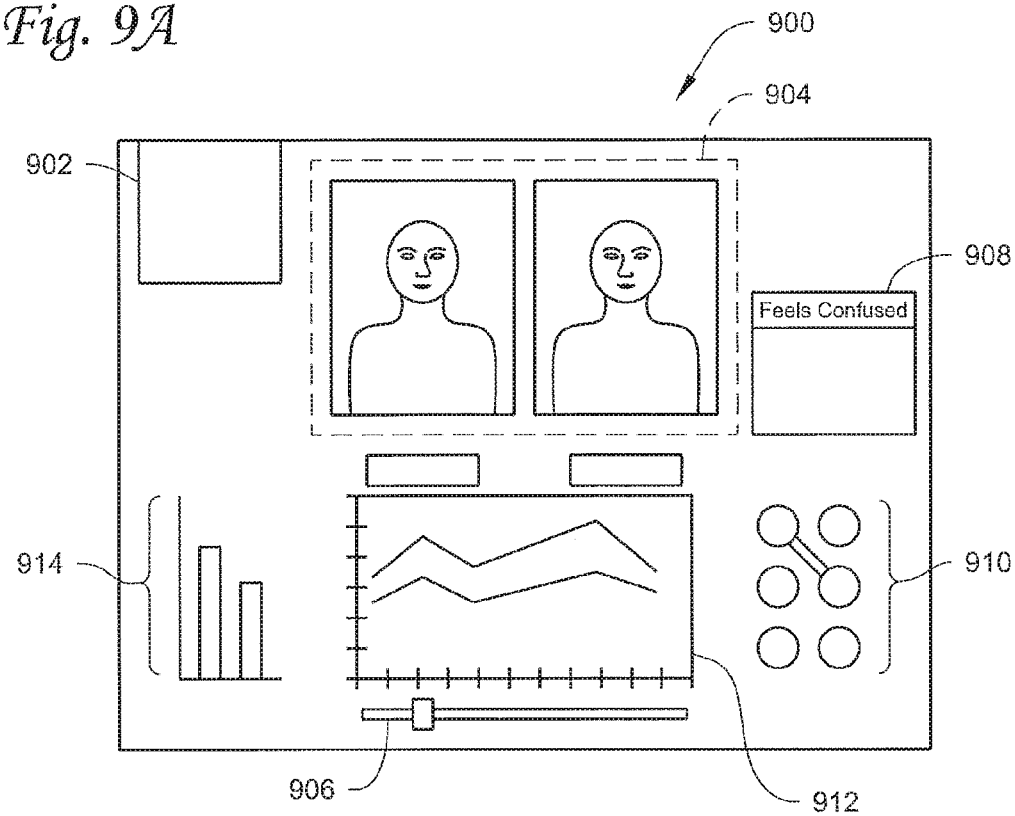
FIG. 9A shows an embodiment of a user interface.

FIG. 9A shows a user interface 900 for the Analyzing Stage of the learning tool described herein. The user interface 900 provides feedback and analyses of results to both participants in a highly visual and interactive fashion. The user interface 900 engages the participants by identifying elements and rankings, and comparing the elements and rankings across the real time of the conversation. This information becomes easily accessible and presented in an intuitive, easily understandable way, which promotes learning. The learning tool described herein may include the user interface 900 as a relationship learning laboratory tool to engage and measure participants' perceptions, assumptions, and hypotheses about each other. This is the Knowledge of Results principle: we learn to the extent we know the outcomes of our efforts.

The user interface 900 shows a dropdown menu of options 902 from which a participant can choose to capture a new video, view a previously recorded video, and/or view an analysis of data collected from a reviewed video. The user interface 900 includes options to increase and/or to decrease the size of the video displayed on the computer system screen. The Left Report presents results for the person seated on the left, in this example Mary. The Right Report presents results for the person on the right, which in this example is John.

The user interface 900 includes a video screen 904 for displaying the video selected to be viewed. The video screen 904 shows the participants as they were recorded. The video screen 904 also shows the time frame (minute:second, e.g., 10:20) of the AV data as the video is played back. A slider control 906 is provided so that it can be moved by the viewer back and forth so that any part of the recorded conversation can be immediately accessed. The affect dimensions menu 908 shows the affect dimensions and rankings that are analyzed. In the example shown in FIG. 9, the affect dimension "feels confused" is being analyzed. Clicking on any one of the other dimensions in the menu 908 would reconfigure field display 910 and graph display 912. The field display 910 shows the identification information, e.g., the first name, of each participant, and their three viewpoints (Self-View, Other-View, Social-View) below the identification information. The viewpoints are shown with connections that visually display assumptions of the viewpoints, described more in detail below (and shown in FIGS. 14-16). Clicking first on the viewpoint of one person and next on a viewpoint of the other person highlights both fields and displays a line connecting both viewpoints. In this way, the user interface 900 allows attention to be focused on exactly which viewpoints are being compared. Inside each viewpoint box includes text information, which states the viewpoint in terms of the dimension selected in field display 910 (e.g., "confused"). A graph display 912 shows a graph of the individual responses of each participant over time. Averaged field 914 shows an average of both rankings in graphic form. The slider 906 shown below the graph display 912 is synchronized with the graph display 912 and the video display, so that participants can move the graph slider 906 to a position of interest on the graph display 912 and the video display on the video screen 904 will also display that synchronized moment.

This synchronization between the graph 912 and the video display on the video screen 904 allows participants to clarify and share their viewpoints, not in abstract generalities but in the specific context from which their viewpoints were derived. When they compare their viewpoints, they become engaged in a process of examining and testing out the accuracy of their viewpoints. When participants respond to a query statement, they are doing so in the context of specific face-to-face events, events which can be interpreted in several ways. This is to say that a participant's responses to query statements could be based on: 1) overt behaviors of the other person, 2) overt behaviors of the participant, 3) memories of past events which somehow influence a participant's perception, 4) interpersonal factors between the participants (e.g., perception of authority, and past experiences in the relationship history of both participants). The point here is that when a participant responds to a query statement or set of query statements, it may not be self-evident to others why he/she responded in a particular manner. The best person to explain responses to query statements is the participant him/herself, and invariably participants seem to come up with understandable reasons for their responses.

Figure 9B:
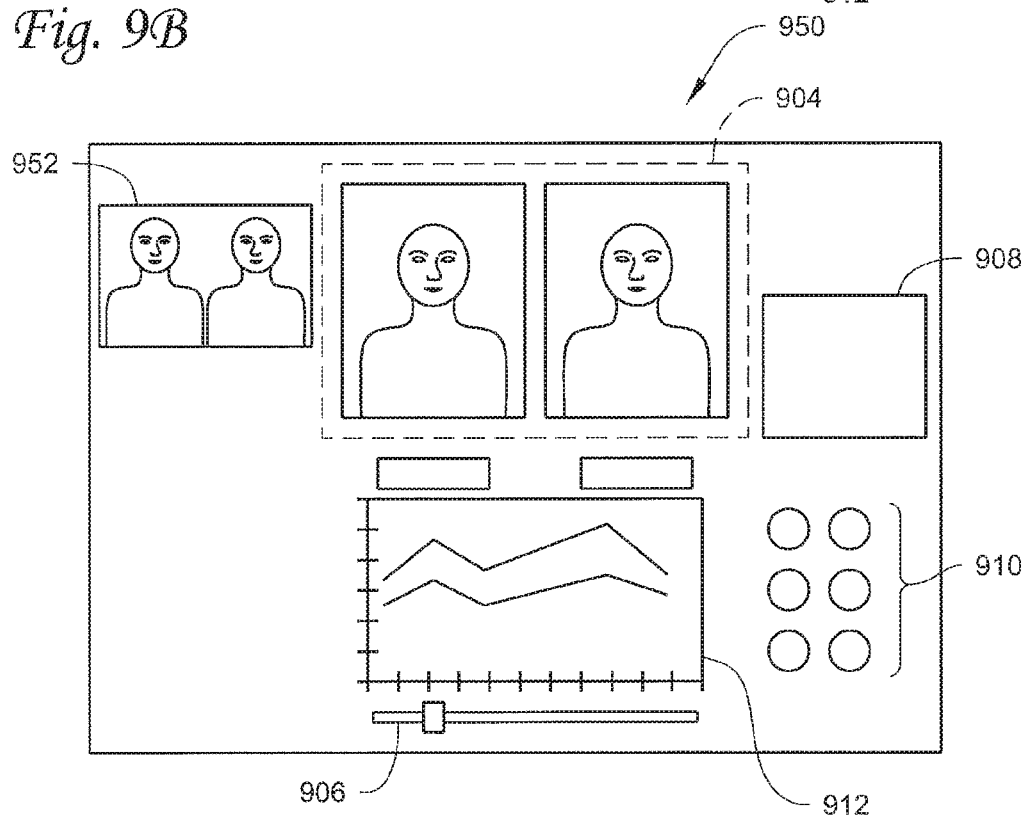
FIG. 9B shows another embodiment of a user interface.

FIG. 9B shows another example interface 950, that is similar to the interface 900 shown in FIG. 9A, but also includes another video window 952 showing and which can capture another image and/or video of the substantially face-on image(s) of persons reviewing the AV data. Other parts of the interface 950 are similar to those in interface 900 and similar components are identified using the same reference characters. The interface 950 provides another means of capturing yet another social interaction of the participants as they review, recall, and discuss the moments of similarities and differences in their viewpoints. When the recording process is on, the interface 950 records, not only the image shown in the video window 952, but also all of the interactions the participants perform with the interface 950. Audio conversation is also recorded. Thus, a new AV data is created that includes the face-on images of the participants shown in the video window 952, and all of the clicks and interface changes that the participants perform as they interact with the interface 950, and the audio conversation during the discussion that can be had between the participants. This can lead to further comprehension and further learning of the social relationship between the participants.

Figure 10:
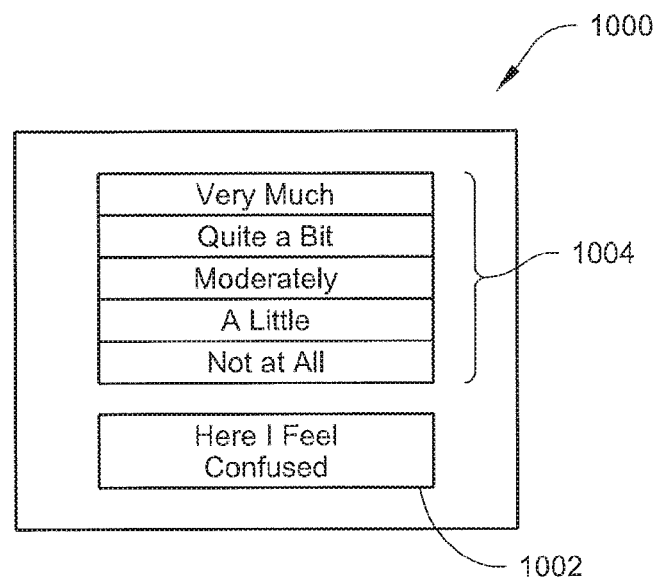
FIG. 10 shows an embodiment of a user interface.

FIG. 10 shows an example of a user interface 1000 (or a portion of a user interface) for responding to a query statement 1002 when an audio record is being reviewed. The function of the audio recording is to provide something to review, and the main function of the audio recording is to act as a stimulus for recall. The recall process, then, is not entirely dependent on a video recording. A feature is that whatever is recorded prompts recall and serves as a reference point in real time so that query statements are presented in a structured manner so that both participants are responding at the same points in real time. A sound recording can prompt recall. Thus recording the conversation of two participants who are in separate physical locations, each with a computer system onto which the recorded conversation is stored. The possible response choices 1004 are provided in the interface 1000.

Figure 11:
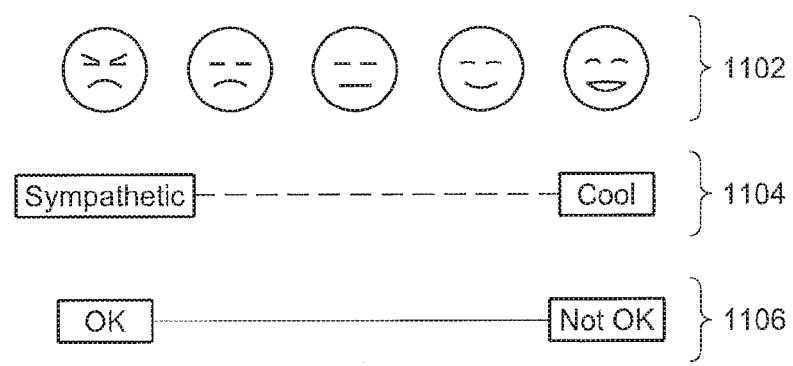
FIG. 11 shows embodiments of query statements and/or responses for the user interface.

The structure of the query statement presentation can include the elements of face-to-face interactions, i.e. multiple viewpoints, affect, and other interpretive rankings. Various affect labels can be employed as long as they sample the dimensions of affect described previously. FIG. 11 shows some example query statement responses. Query statements need not consist only of words but could also be symbolic as described previously. Likewise, the response choices may vary from a binary choice (yes, no) to multiple-choice. Social psychology research has developed various ranking scales, which might be applied. For example, icons representing varying degrees of emotional states 1102 may be used as responses to query statements. For example, semantic differential words to indicate their preference 1104 may be used. For example, a simple continuum without gradations 1106 may be used.

The language used for the query statements and responses can be any spoken language, preferably being the language preferred by the participants. It is also possible for query statements to be presented in the native language of each participant. For example, query statements to one participant might be in French and Arabic to another. For multilingual inquiries, translated query statements should be tested for accuracy of meaning. For query statements using affect labels, comparable translations should not be limited to the meaning of particular words but should sample the different dimensions of affect.

The timing of the query statements can vary, both for the duration of query statement presentation and for the latency interval between query statements. Certain applications and populations may require a slower or faster rate of presentation. Because the reaction times for each query statement are recorded, it is possible to identify optimal timing parameters for query statement presentation and latency between query statements. Likewise, analysis of the reactions times for different query statements, viewpoints, and affect dimensions may yield significant information relevant to understanding face-to-face interactions. The query statements are linked in real time to the video playback so the context of the query statement response can be identified.

For group applications, there are multiple viewers who are all presented with identical query statements, and each viewer responds privately by means of wireless instrumentation. While all participants in the group are presented with the same query statement, the participants also complete several identifying query statements, such as gender, age, race, job responsibility, etc. The analysis stage presents aggregate results for the entire group as well as separating the results for different groups. For some applications the identifying query statements might include personality types, such as Introvert . . . Extrovert, or different personal preferences. Likewise, the query statements might refer to different viewpoints, Self, Other, Social. Groups can have some agenda, and specific query statements might be tailored to address issues relevant to the agenda.

The participants can review their interactions that include themselves. But once a recording has been made, the recording can be reviewed by other people and in several different ways. For example, a recording of a dyad might be reviewed, but rather than by the original participants, other persons might attempt to answer the original query statements as if they were the person on the screen. Analysis of the results would involve comparing responses of the secondary viewers with the responses of the original participants. This application would seem to have much potential in training people to gain listening and empathy skills. Another variation would be to have an entire group review a dyad recording and respond to the original query statements. Such an application may help people learn certain tasks, such as interviewing or specific counseling skills.

Figure 12:
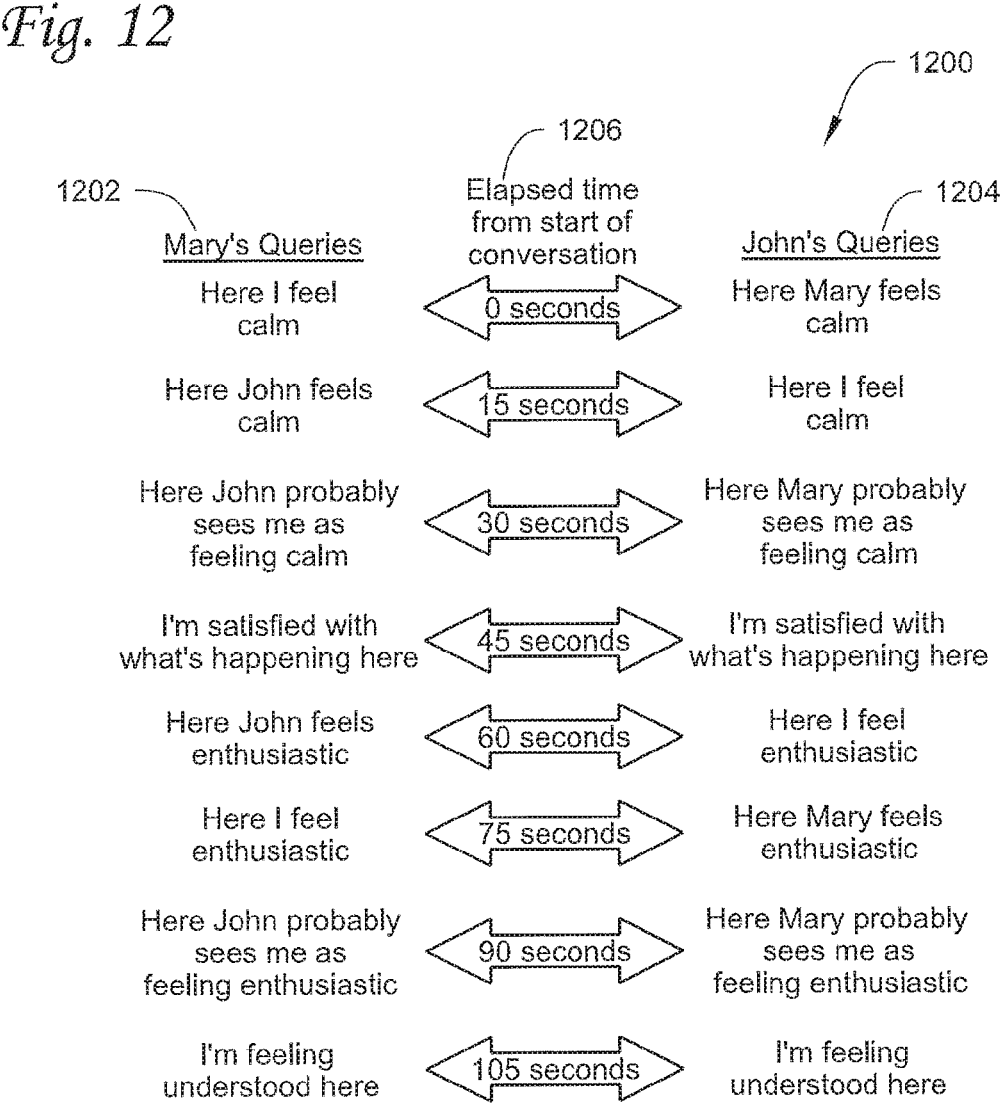
FIG. 12 shows an example of a comparison of query statements between two people in time.

FIG. 12 shows an example review inquiry 1200 showing a first person's query statement data 1202, being compared to a second person's query statement data 1204. The first and second persons respond privately and cannot see the responses of the other's. Thus, the autonomous, independent observation of each is protected so that the viewpoints are truly independent and not immediately influenced by the other person's responses. The first and second persons are not comparing notes as they observe, and independence of reporting gives credibility to any patterns that emerge from data analysis. It also gives credibility to the persons themselves, who respond, for better or for worse, and can recognize their own responses. This independence between observers forms the foundation of empirical inquiry and engages participants in their own scientific inquiry. The observations are synchronized along the timeline 1206 in real time with the playback recording of behavioral events, each observation is anchored in the behavioral record. Thus, "snapshots" can be examined in reference not just to time but also the behavioral context. Both first and second persons make observations from three distinct viewpoints: 1) Self viewpoint: how the first person views herself; how the second person views himself, 2) Other viewpoint: how the first person views the second person; how second person views the first person, and 3) Social viewpoint: how the first person thinks the second person is viewing her; how the second person thinks the first person is viewing him. Observations from each viewpoint may vary as to how much they are based on overt behaviors and/or covert private cognitions that include both current perceptions and recall of past experiences. Observation data are in response to specific query statements (usually about affect) presented at 15-second intervals and repeated over the duration of the viewing. The query statements are not open-ended but present a scale of choices such as: "not at all", "a little", "moderately", "quite a bit", "very much." This structure permits quantification and objective measurement, which forms a database to identify patterns not only within a single session but also across multiple sessions by the same or different participants. Quantification also permits a summary of meaningful data for the purpose of research, training, and learning. The observation data are not only synchronized to the behavioral record but they are also linked together by the behavioral record on the recording so that both first and second persons are observing the same overt behaviors but from different points of view. This pairing or linking of query statements permits meaningful data analysis and discussion about different viewpoints by the participants.

The fixed sequence of query statements can be repeated. This structure is like a net of questions catching the observations of both participants over their entire interaction. For example, each participant might be asked to rank how comfortable he/she felt every four minutes. After a 40-minute conversation, each participant would have reported his/her level of comfort ten times.

Because participants are observing their face-to-face interaction, each observer is also the object of observation by the other person. This is done empirically by pairing different points of view (self-view for Person A and other-view for Person B). Examples of this reciprocal pairing occur at, for example, seconds 0, 15, 60 and 75. This reciprocal pairing of query statements makes it possible to assess perceptiveness and expressiveness, because it permits correlating the Self-View of one person with the Other-View of the other person which are synchronized to occur at the same instant in time. Likewise, the social-view (how I think the other person is viewing me) engages each person in hypothesizing how he or she thinks they are coming across to the other.

Figure 13:
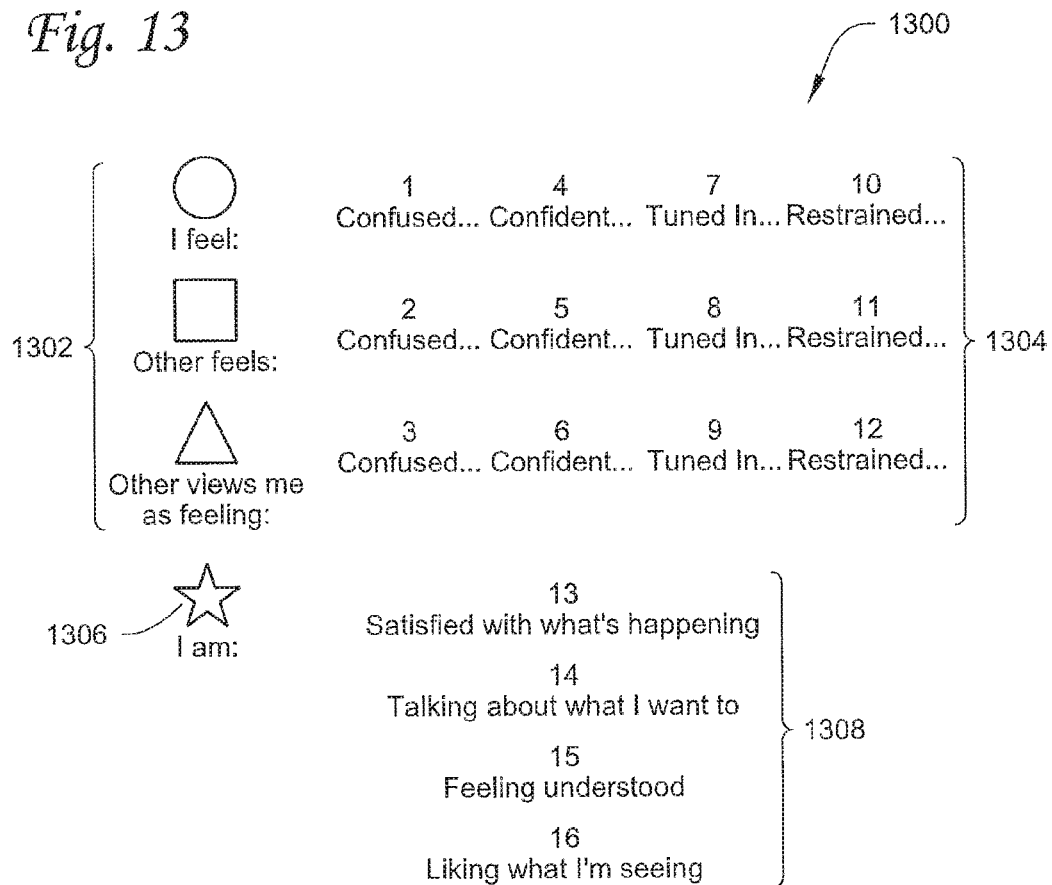
FIG. 13 shows an example of query statement structure.

FIG. 13 shows example query statement structure 1300 which include three viewpoints 1302, four dimensions of affect 1304, and a cognitive assessment 1306 with four cognitive assessment rankings 1308. In this embodiment, there are sixteen query statements with multiple viewpoints, and so on. These query statements are presented to both persons (Person A, Person B in this example). Thus an example Query statement that can be presented is "Here I feel Confused." Another Query statement that can be presented is "Here (name of partner) feels confused." Another Query statement that can be presented is "Right here (name of partner) probably views me as feeling confused." Another Query statement that can be presented is "Here I feel Confident." Another Query statement that can be presented is "Here I feel understood." And so on. These query statements are preset, and the actual affect labels may vary, but query statements are from the same affect dimension, e.g., high negative affect, and so forth. The position of each dimension on the inquiry net provides for consistency, making analysis of the results more efficient when different affect labels are used.

The process for the method described herein is to define a process that is virtually invisible and unnoticed until assumptions are proven wrong. This process is considered here to be at the core of human understanding and misunderstanding. The following illustrates this process with reference to a single, static dimension, perception of physical height. The elements of this process are two individuals, each with three viewpoints. When viewpoints are compared, they form the basis for relationship assumptions. When relationship assumptions lead to behavioral actions, they can be considered as hypotheses which both parties use as working assumptions to test the validity of their assumptions.

To focus on the process is to emphasize the fact that when people are face to face, they not only observe each other, but they also make themselves available to be observed. When they allow themselves to be observed, they attempt to observe themselves through the eyes of another. Thus, three levels of observation forming the foundation of the three viewpoints, Self, Other, and Social, are possible. Human beings are always defining and understanding ourselves, not so much abstractly, but specifically, in how we see ourselves in relationship and relating to other human beings.

Figure 14:
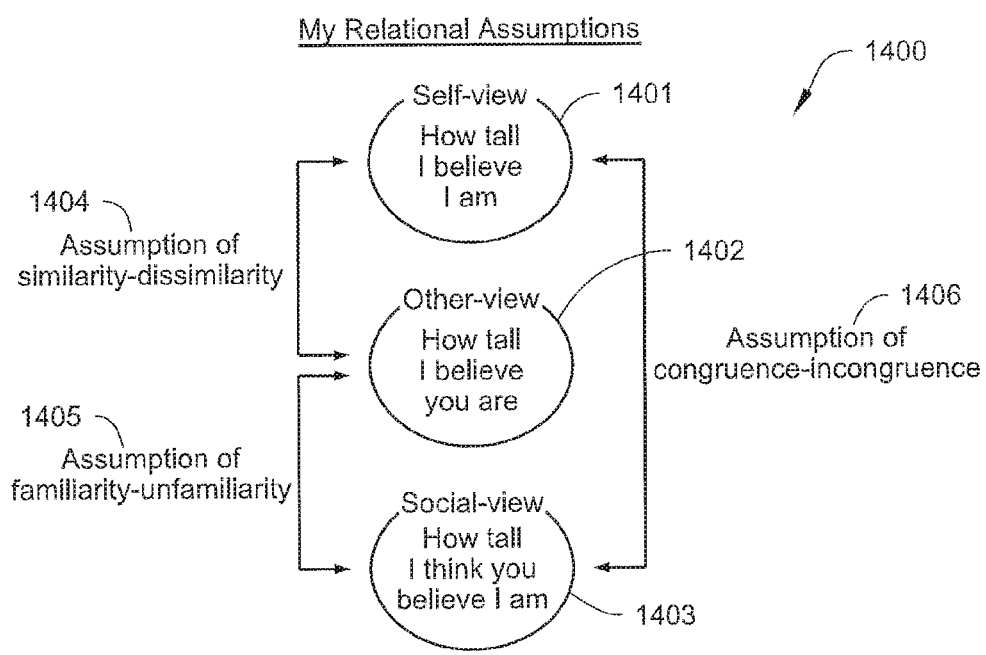
FIG. 14 shows an example of relational assumptions of the three viewpoints.

FIG. 14 shows the elements of this process 1400, which involves three viewpoints: 1) Self-View 1401 (how I view myself), 2) Other-View 1402 (how I view the other person), 3) Social-View 1403 (how I think another person views me). The simplest human relationship is comprised of two people, a dyad. Both parties have three viewpoints 1401, 1402, 1403 and they can state these viewpoints 1401, 1402, 1403 along any number of dimensions, for example: height, weight, age, and gender. Using physical height as a dimension of comparison, one can state his/her belief about his/her own height, his/her estimate of another's height, and his/her estimate of another's belief of one's height. These three viewpoints 1401, 1402, 1403 are always present and when viewpoints 1401, 1402, 1403 are compared, they can also be considered as assumptions.

An assumption is defined here as any viewpoint assumed to be true until proven otherwise. The assumptions 1404, 1405, 1406 become apparent when we compare viewpoints 1401, 1402, 1403. In relational terms we are always comparing, (i.e. defining, understanding, measuring) ourselves to others.

Figure 15:
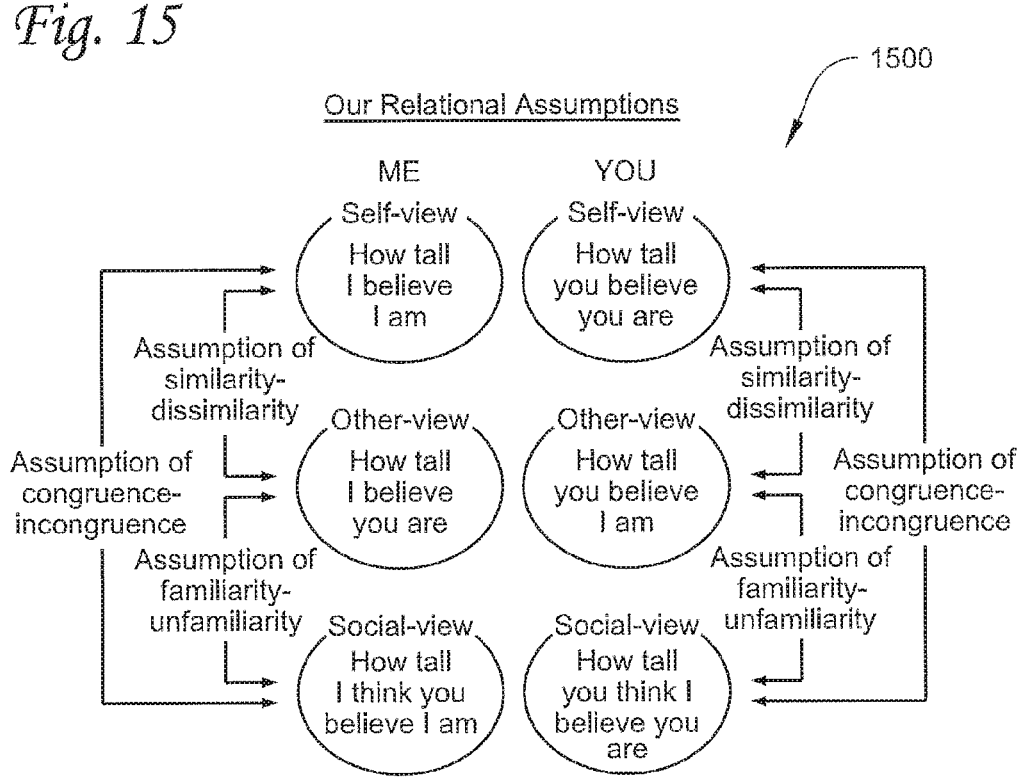
FIG. 15 shows an example of relational assumptions of the three viewpoints between two people.

FIG. 15 shows an example of comparing viewpoints and relational assumptions 1500. When different viewpoints are compared, assumptions become evident, and the first step in dealing with assumptions is to define them. An assumption of similarity (or dissimilarity) is implicit in comparing my self-view with my other-view, e.g., how tall one believes he is compared to how tall he believes the other to be. If these two viewpoints are very close, an assumption of similarity is made. If they are very different, an assumption of dissimilarity is made. An assumption of familiarity (or unfamiliarity) is implicit in comparing one's other-view with one's social-view, e.g., how tall one believes another to be is compared to how tall one thinks another believes one to be. An assumption of congruence (or incongruence) is implicit in comparing one's self-view with one's social-view, e.g., how tall one believes one to be is compared to how tall one thinks another believes the one to be. The premise being that the minds are always active with these three basic viewpoints when dealing with human relationships even though humans might not be aware of them. Our minds are always monitoring positions relative to surroundings, best exemplified by our perceptual-motor nervous system. The five senses monitor the surroundings and supply information to the brain, which integrates this information so as to direct the motor activity in the surroundings, which, in turn, changes one's perception. Relational assumptions are part of the perceptual motor processes as the mind integrates information it perceives about other human beings. FIG. 15 shows some of these assumptions in regard to a rather static dimension, perception of physical height. When these assumptions arise from viewpoints about another person, it is possible to make additional comparisons of viewpoints, the viewpoints of the other person, viewpoints not only within each person (i.e. assumptions) but also between persons.

Figure 16:
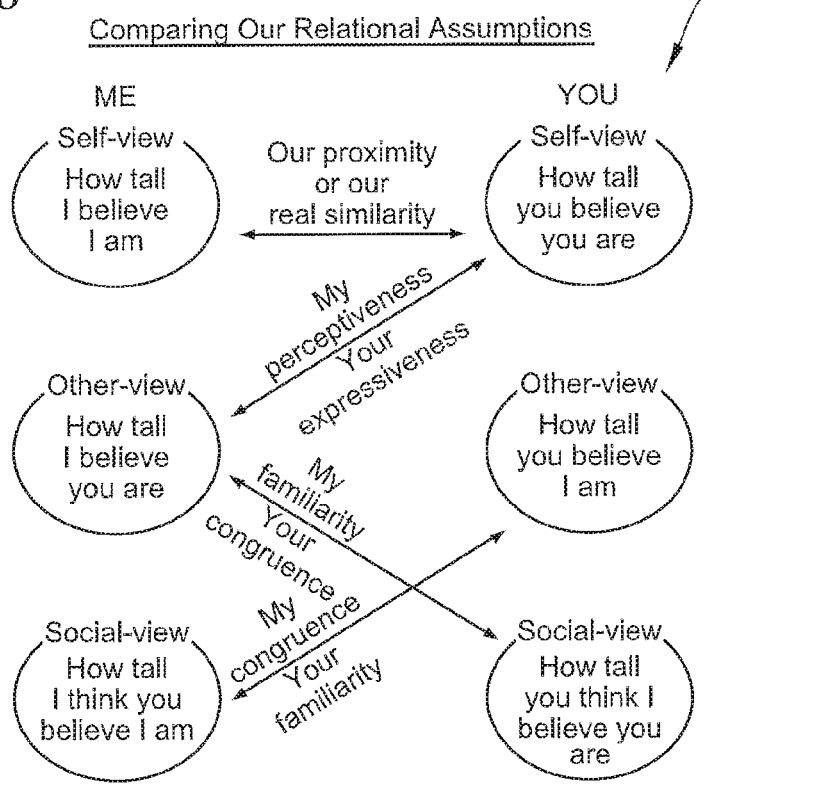
FIG. 16 shows an example of a comparison of relational assumptions between two people.

FIG. 16 shows an example of comparing the viewpoints between people for interpersonal hypothesis testing 1600. Assumptions emerge from comparison of each person's viewpoints, and assumptions can be considered as hypotheses each person has about the other. Hypotheses are working assumptions, i.e. assumptions, which have behavioral consequences and which are not assumed as true until proven otherwise. The validity or "truth" of a hypothesis can be tested when one person's hypothesis matches or agrees with another person's hypothesis. FIG. 16 shows how testing can occur when different viewpoints are compared between two persons. For the sake of illustration, the dimension of each viewpoint is perception of physical height, a static dimension, which does not change quickly, and for this reason the time frame and behavioral context for the comparisons is not critical. It makes little difference whether both parties state their viewpoints an hour, a day, or even weeks apart from each other. In this example time is not a factor, and the focus here is on the comparisons between each person's viewpoints. Proximity or real similarity is used herein as the degree of similarity between the Self-Views of both persons. This is the place to start any comparison of viewpoints between persons.

When dealing with relational assumptions or hypotheses, the first consideration is to clarify how much in agreement both parties are independent of their views of each other. This is done by a comparison of each person's Self-View reported independently. Failure to take this into account leads to confusion about the other viewpoints (Other and Social). For example, if one person seems very accurate in describing another person, it's always possible that the first person is not distinguishing between the three viewpoints and is simply projecting his/her Self-View, which could be very accurate, if both persons are indeed very similar.

Perceptiveness is used herein as the comparison between my Other-View and your Self-View. If one can identify how another sees himself/herself, the one can be considered to be perceptive. Perceptiveness implies expressiveness. The reciprocal of one person's perceptiveness is the other person's expressiveness. Some people are more expressive than others, and this is a factor that can influence how perceptive other people are in relation to them. With our example of perception of physical height, people express their height differently, i.e. some have more erect posture, making their physical height more evident to others. In the example of FIG. 16, only "My" perceptiveness is depicted, for the sake of simplicity. But "Your" perceptiveness could also be represented by an arrow connecting Your Other-View and My Self-View. When considering perceptiveness, it becomes clear that proximity or real similarity between two people needs to be taken into account. When two people are very similar (e.g., they have the same physical height), it may not be possible to separate perceptiveness from mere projection. It's as if to say: "If everybody is just like me, then I'm always accurate in perceiving them. My relational assumptions are always true." However, when two people are indeed different on some dimension, then perceptiveness (and expressiveness) becomes more important in accuracy. This would occur when our Self-Views are quite different.

Familiarity and Congruence are comparisons between the Other-View and Social-View across both persons. Familiarity is defined here as the comparison between My Other-View and Your Social-View. If how one sees another matches how another thinks the one sees the other, one can be considered to be quite familiar with the other. Congruence is used herein as the comparison between My Social-View and Your Other-View. If how one thinks another views the one matches how another actually views the one, then the one can be considered to be congruent. The reciprocal of familiarity is congruence. That is, another's congruence is the reciprocal of the one's familiarity, and the another's familiarity is the reciprocal of the one's congruence.

Figure 17:
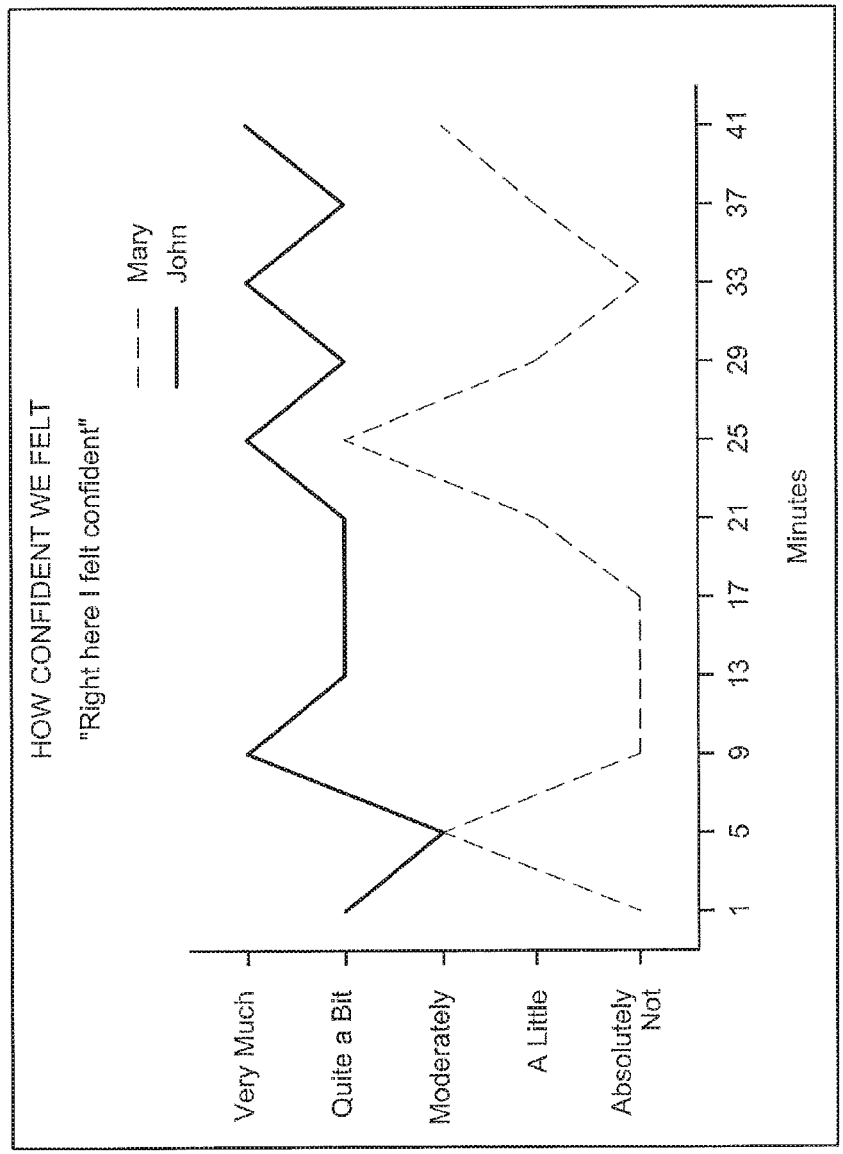
FIG. 17 shows an example of a graphic display of a time sequence data analysis.

FIG. 17 shows an example of a summary of individual responses with graphic display 1700. The graphic display 1700 can be provided in the graph display portion of the user interface. Individual responses to a single query statement can be summarized and presented visually so that each response can be viewed in reference when it was made in real time. This is done with a graphic display that shows a sequence of individual responses over time as in FIG. 17 where the Self-Views about feeling confident from both persons are presented. As FIG. 17 shows, there is some variability in how confident the two participants, e.g., Mary and John, reported feeling, with John reporting a higher level of confidence overall. Minute 9 is striking because both persons reported very different levels of confidence. Mary viewed herself as most confident at minute 25. When presented with such a graph, participants often cannot recall the specifics that led them to respond in a certain way. However, they can replay the exact moments of their recorded conversation when they responded to the query statement, at which time they usually recall the basis for their particular response. One feature of the method, system, and device described herein is the ability to link viewpoints with the behavioral events that contributed to the viewpoints. When this linkage takes place, learning can occur both at the individual and relationship levels. In Knowledge of Results terms, the graphs connect viewpoints (anticipated results) with behavioral actions and provide observed results. Such connections generate the associations necessary for individual learning to occur. Relationship learning occurs because the responses of both participants are presented over time, allowing them to compare viewpoints and see together what simply cannot be seen alone. The graphs help participants to look back in an empirical way, allowing them to see for themselves. This process is at the core of learning, discovery learning rather than performance learning. The feedback engages participants in experimenting and discovering on their own initiative.

Figure 18:
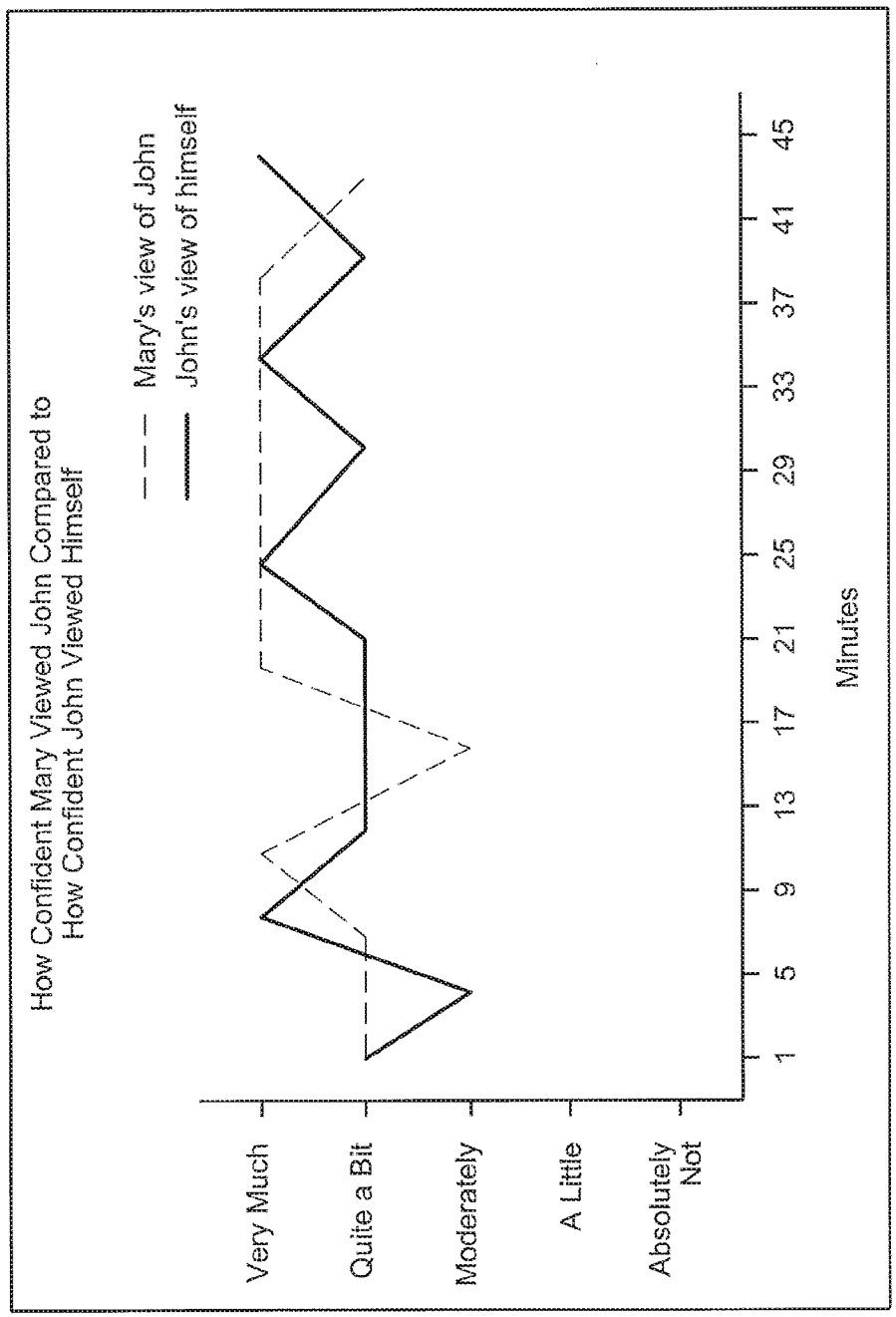
FIG. 18 shows an example of a graphic display of a time sequence data analysis.

FIG. 18 shows another example of a graphic display 1800, this time comparing, again as an example two participants Mary and John, Mary's Other-View with John's Self-View. The graphic display 1800 can be provided in the graph display portion of the user interface. Both agree that John was moderately to very much confident, but there is some variability where they were more in agreement (e.g., minutes 25 and 37).

Figure 19:
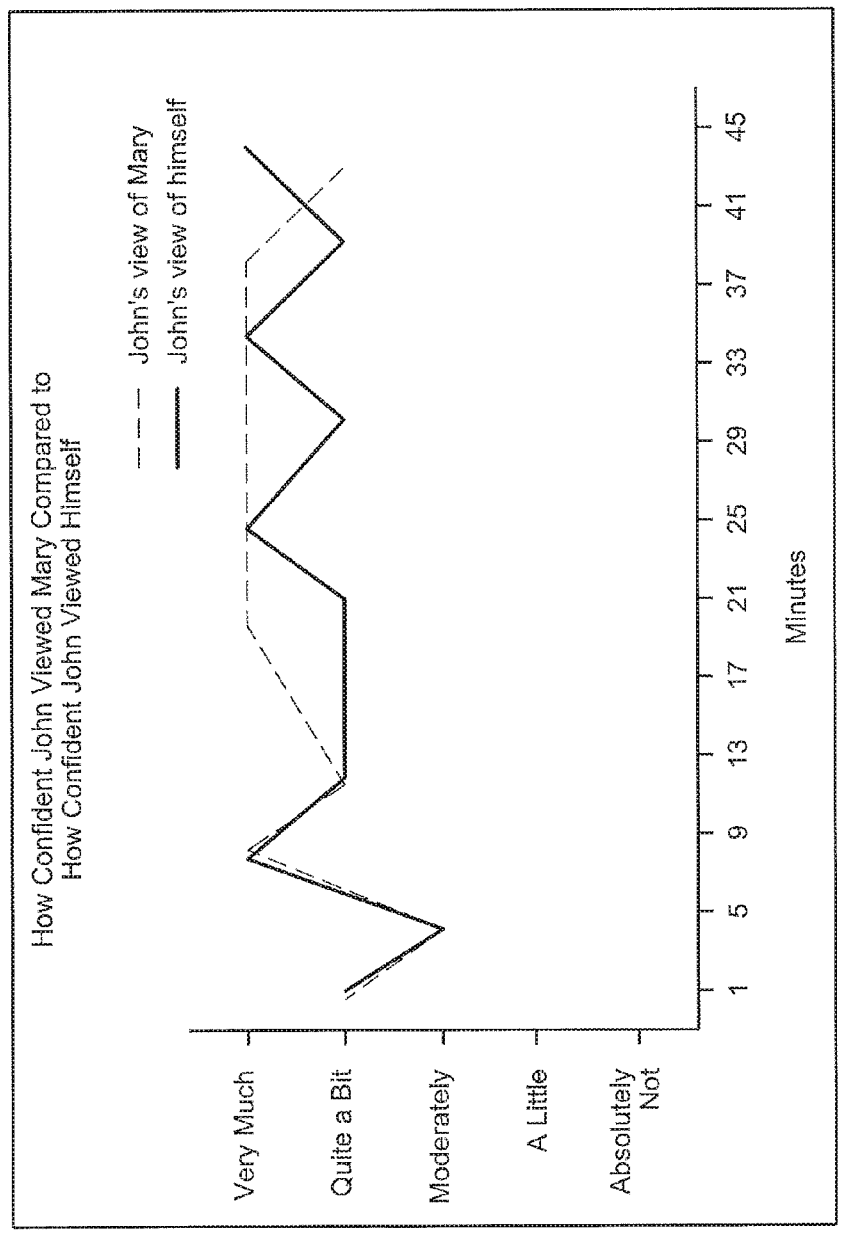
FIG. 19 shows an example of a graphic display of a time sequence data analysis.

FIG. 19 shows another example of a graphic display 1900 that compares the viewpoints for one participant comparing his Self-View with his Other-View. The graphic display 1900 can be provided in the graph display portion of the user interface. Comparing these two viewpoints for the same person can clarify assumptions of similarity-dissimilarity. The graph displays the individual data points for each view, and examination of the graph shows that, again using the two participants Mary and John as an example, John was assuming complete similarity with Mary for the first 13 minutes of their conversation and at minutes 25 and 37.

Figure 20:
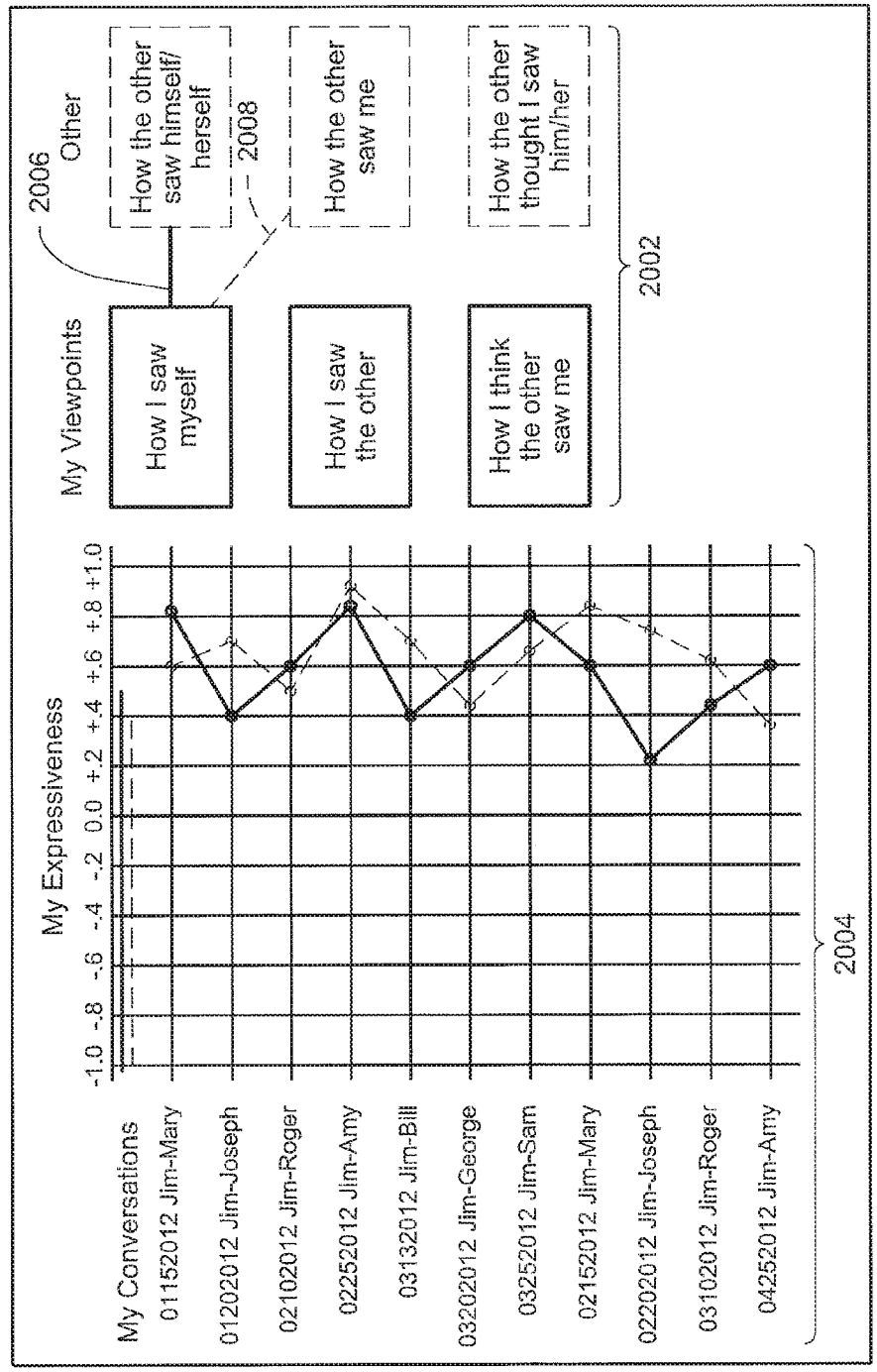
FIG. 20 shows an example of a graphic display of data analysis across several face-to-face interactions.

FIG. 20 shows an example of a graphic display 2000 of data analysis across several face-to-face interactions. The graphic display 2000 includes a field display 2002 and a graph 2004, both of which can be provided as portions of the user interface (for example, similar to field display 910 and graph 912 shown in FIGS. 9A and 9B). The field display 2002 is selectable such that one or more graphic link 2006, 2008 showing the selected comparison of persons' viewpoints that are displayed in the graph 2004 is displayed. The selected comparison changes the graph 2004 that is displayed to show the associated quantified statistical values are graphed between recorded data of conversations. The example shown in graph 2004 displays the statistic of "Expressiveness" that is plotted across several conversations between a first person, "Jim" and other people, "Mary, Joseph, Roger, Amy, Bill, George, and Sam." The graph 2004 shows the statistical graphs, as an example, of Proximity (i.e. Real Similarity) and Expressiveness (Jim's expressiveness) across several partners (Mary, Joseph, Roger, Amy, Bill, George, and Sam). The graph 2004 can display any statistics generated from the data base gathered using the learning tool. The significance of the graphic display 2000 is that it permits grouped or aggregate data for identifying trends, such as across gender, age, race, role position. In this way, a significant trend can be identified, and the user could then go directly to an individual session for closer analysis of particular stored data (e.g., AV data and the associated data) of a specific conversation. In this way individual session data can be grouped to show a range of quantified values (e.g., satisfaction) and the user could then examine the individual sessions (e.g., the highest and lowest satisfaction sessions). This can provide great utility for learning, research, and general education.

Figure 21:
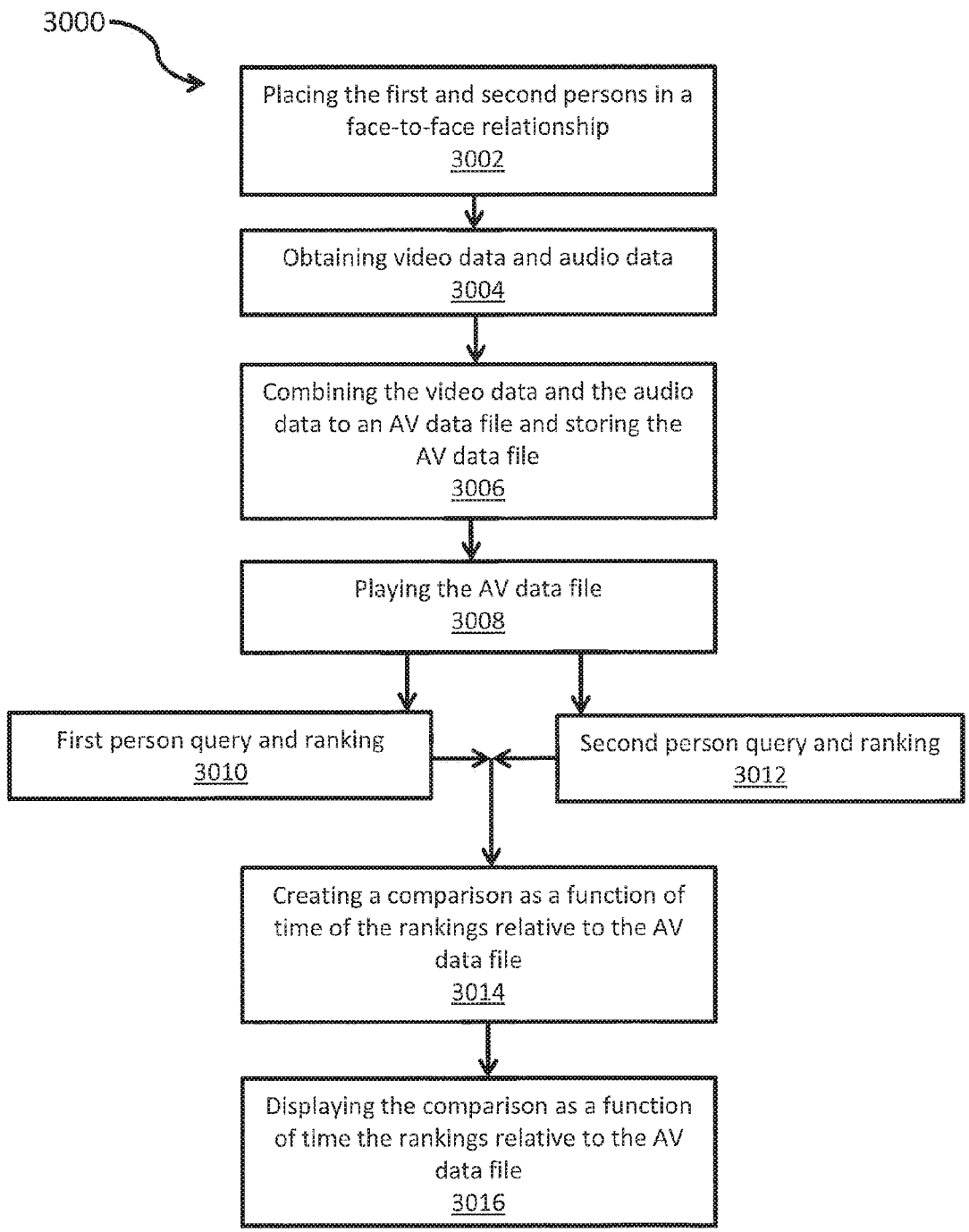
FIG. 21 illustrates a flowchart of a method according to an embodiment.
Figure 23:
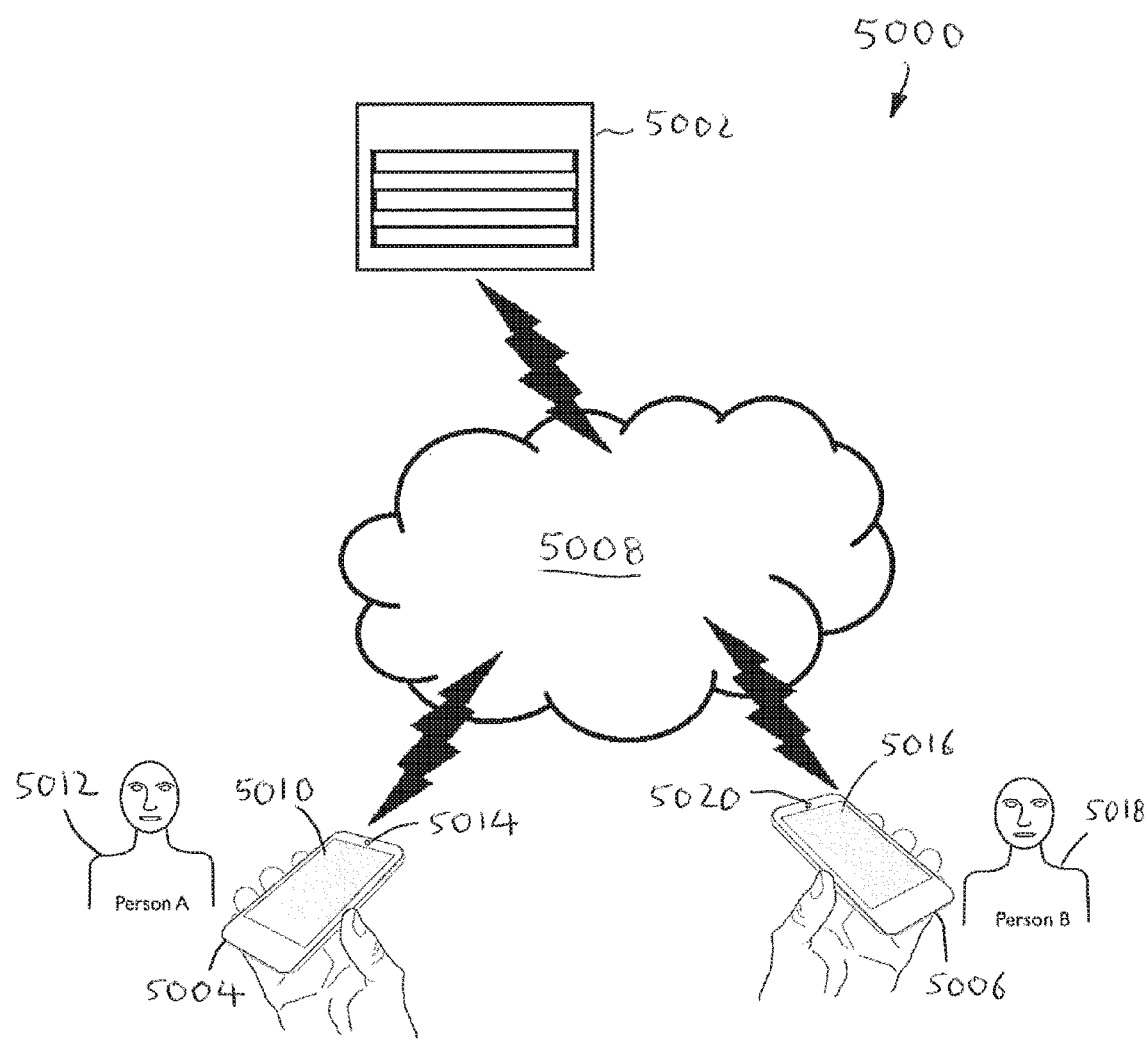
FIG. 23 shows an embodiment of a learning tool system.

FIG. 21 shows a flowchart according to an embodiment of the method of using a personal relationship learning tool. In an embodiment, the personal relationship learning tool includes a camera system which obtains a video data including a substantially face-on first video of the first person and a substantially face-on second video of the second person during a face-to-face conversation between the first and second persons, an audio recording system which obtains an audio data of the first and second persons during the face-to-face conversation between the first and second persons, a computer system which receives the video data and the audio data, and a ranking system which allows the first and second persons, respectively and independently, to rank first and second query statements with respect to the face-to-face conversation. In another embodiment, which is shown in FIG. 23, the personal relationship learning tool includes a computer server connected to at least two mobile devices.

The method 3000 includes placing 3002 the first and second persons in a face-to-face relationship, either in person facing each other, or via mobile devices connected via a network for communicating therebetween, wherein the first person's face is viewable on the second person's mobile device, and the second person's face is viewable on the first person's mobile device. Then the method 3000 proceeds to obtaining 3004 AV data of the first and second persons, combining 3006 the AV data to an AV data and storing the AV data in a computer system or a computer server. The method 3000 includes playing 3008 at least a portion of the AV data, with the computer system and/or one or more of the mobile devices, and while the AV data is being played, having 3010 the first person consider the first query statement and provide a first ranking with respect to the query statement, and having 3012 the second person, independent from the first person, consider the second query statement and provide a second ranking. The method 3000 then proceeds to creating 3014 a comparison as a function of time of the first and second rankings relative to specific moments in time of the AV data, and displaying 3016 to at least one of the first and second persons the comparison as a function of time of the first and second rankings relative to the AV data, wherein periods of similarities and differences between the first and second rankings can be observed and discussed, which becomes points of learning.

Figure 22:
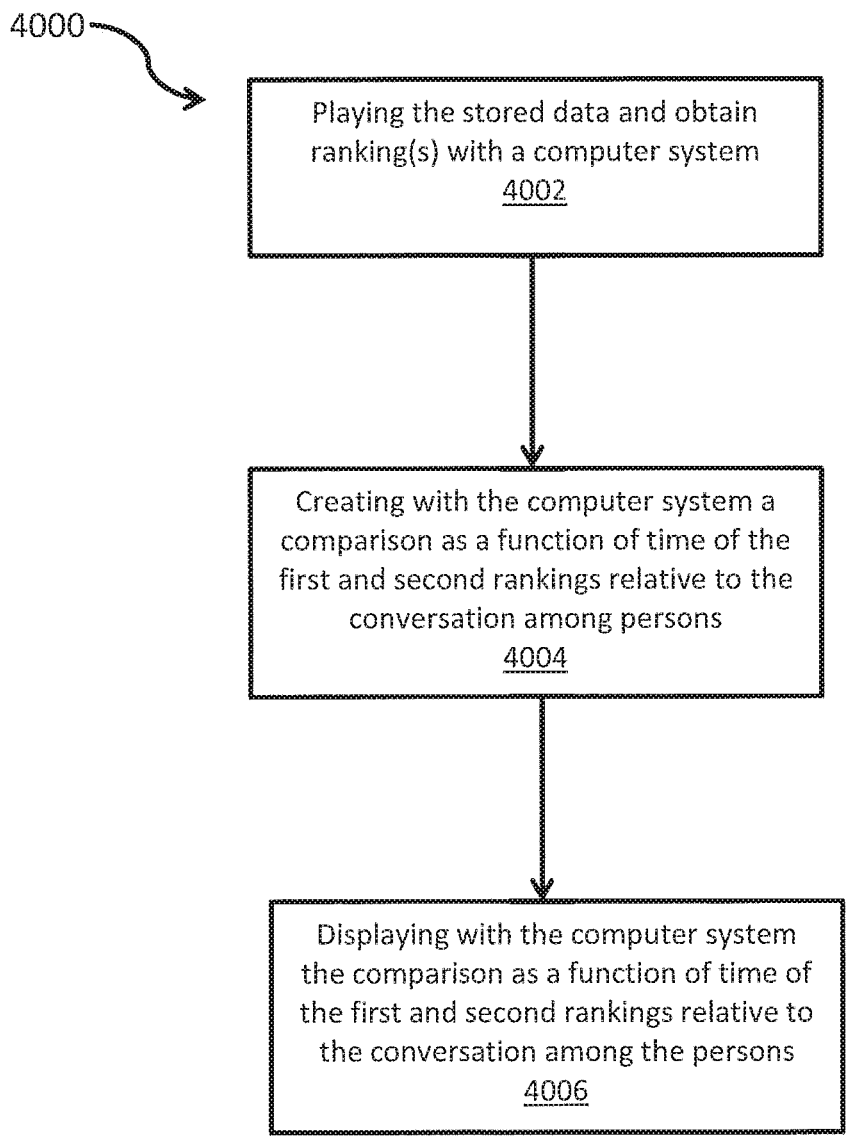
FIG. 22 illustrates a flowchart of a method according to an embodiment.

FIG. 22 shows a flowchart of an embodiment of the method of analyzing data gathered by a personal relationship learning tool, wherein the tool includes a data gathering system that gathers data about persons during a conversation among them and a computer system connected to the data gathering system for receiving the data and storing. The tool further includes a ranking system which allows at least some of the persons to independently rank first and second query statements with respect to the conversation. The method 4000 shown in FIG. 22 includes playing 4002 the stored data (e.g., AV data) with the computer system or the computer server to allow one of the persons to rank a first query statement with the ranking system to obtain a first ranking and to allow another of the persons to rank a second query statement with the ranking system to obtain a second ranking. The method 4000 includes creating 4004 with the computer system a comparison as a function of time of the first and second rankings relative to the conversation among the persons (e.g., in the AV data). Then the method 4000 proceeds to displaying 4006 with the computer system (or the computer server or one or more of the mobile devices) the comparison as a function of time of the first and second rankings relative to the conversation among the persons, wherein periods of similarities and differences between the first and second rankings can be observed and discussed, which then become points of learning.

An embodiment of the learning tool which includes one or more mobile devices (e.g., smart phone, tablet, etc.) is presented in detail in FIGS. 23-31.

FIG. 23 shows a learning tool system 5000, which includes a computer server 5002, a first mobile device 5004, and a second mobile device 5006 in communication via a network 5008. The first mobile device 5004 is configured with a processor, a network interface, and a touch screen display 5010 via which a first person (Person A) 5012 can interact with the first mobile device 5004. The first mobile device 5004 also has a forward facing camera component 5014 which is configured to capture the first person's 5012 face-on image as the first person 5012 interacts with the first mobile device 5004. The second mobile device 5006 is also configured with a processor, a network interface, and a touch screen display 5016 via which a second person (Person B) 5018 can interact with the second mobile device 5006. The second mobile device 5006 also has a forward facing camera component 5020 which is configured to capture the second person's 5018 face-on image as the second person 5018 interacts with the second mobile device 5006. The computer server 5002 can be another mobile device.

System 5000 has three different configurations.

In the first configuration, the cameras 5014, 5020 are activated to obtain AV data of face-on images of the users of the first and second mobile devices 5004, 5006. The mobile devices transmit the AV data to the computer server 5002 via the network 5008. The computer server receives the AV data via the network and combines the AV data from each of the mobile devices to form a combined, time synced, combined AV data.

In the second configuration the cameras are de-activated and the touch screens 5010, 5016 are activated to display a touch-based graphic user interface having ranking portions for receiving ranking inputs by the users. In this second configuration, the computer server is accessed to transmit the combined AV data and a series of query statements to the mobile devices via the network. In this way, each of the mobile devices receives the combined AV data and the query statements, each of the mobile devices displays the combined AV data on the touch screen, and displays the series of query statements overlaid on the combined AV data as the combined AV data is displayed on the touch screen, so that the series of query statements are displayed at the same time mark of the combined AV data for each of the mobile devices. With the touch screens activated, the users are called to provide rankings of response to the query statements. The user of the first mobile device 5004 provides a first rank, and the user of the second mobile device 5006 provides a second rank. The computer server receives the first rank and the second rank and forms a comparative rank data from the first rank and the second rank, and stores the comparative rank data to the computer-readable non-transitory computer-readable memory.

In the third configuration, the cameras and the ranking portions of the touch screens are de-activated and for at least one of the mobile devices, the comparative rank data which is stored on the non-transitory computer-readable memory of the computer server via the network, is accessed and displayed on the touch screen. In this way, the comparative rank data shows to the user periods of similarities and differences of the first rank and the second rank, and includes a comparison of the social view to the other view. The periods of similarities and differences are for being observed and discussed to become points of learning for the users.

More particularly, FIG. 24 shows a flowchart according of the method of using the personal relationship learning tool shown, for example in FIG. 23 (the personal relationship learning tool 5000 in FIG. 23) which includes the computer server (5002 shown in FIG. 23) connected via the network (5008 shown in FIG. 23) to two mobile devices (5004, 5006 shown in FIG. 23).

The method 5100 includes connecting 5102 via the network to the computer server with the first mobile device operated by a first person A, and with the second mobile device being operated by a second person B. The first and second mobile devices are connected via the network for exchanging data 5104 (e.g., communicating) so that the first and second persons A, B can have a face-to-face communication with each other, wherein the face of the first person A face is viewable on the second person's mobile device 5106, and the face of the second person B is viewable on the first person's mobile device 5108.

During the communicating, the method 5100 proceeds to the computer server obtaining 5110 AV data of the first and second persons from the first and second mobile devices, combining the AV data to generate a combined AV data, and storing the combined AV data as a computer-readable file in a computer-readable non-transitory memory of the computer server.

The method 5100 includes transmitting 5112 the combined AV data to the mobile devices, so then playing 5114 the combined AV data on the first and second mobile devices. While the combined AV data is being played on the first mobile device, a first query statement (or a series of first queries) is displayed on the first mobile device, and the first user provides a first ranking with respect to the first query statement by interacting with a graphical user interface displayed on the first mobile device. Further, while the combined AV data is being played on the second mobile device, a second query statement (or a series of second queries) is displayed on the second mobile device, and the second user provides a second ranking with respect to the second query statement by interacting with a graphical user interface displayed on the second mobile device. The first query statement and the second statement are respectively displayed independent of one another, but at the same moment in time of the time line of the combined AV data. For example, if the first query statement is displayed at time 0:15 seconds into the total play time of the combined AV data, the second query statement is displayed at time 0:15 seconds into the total play time of the combined AV data, although the first query statement and the second query statement are each displayed separately and independently on each of the mobile devices. Then, the method 5100 proceeds to transmitting 5116 via the network, the first ranking and the second ranking from each of the respective mobile devices. The method 5100 then proceeds to the computer server creating 5118 a comparison as a function of time of the first and second rankings relative to specific moments in time of the combined AV data. Then, the method 5100 proceeds to transmitting and displaying 5120 on at least one of the first and second mobile devices the comparison, wherein periods of similarities and differences between the first and second rankings can be observed and discussed, which becomes points of learning for the first and second persons.

FIG. 25 shows one of the mobile devices 5122 displaying the combined AV data on a screen 5124 (e.g., touch screen). The combined AV data shows a substantially face-on image of the first person A and a substantially face-on image of the second person B during a face-to-face conversation between the first and second persons A, B.

FIG. 26A shows the first mobile device 5126 displaying the first query statement 5128 during playback of the combined AV data at a specific time during the playback. The first query statement 5128 in this example is a statement directed to how the first person A felt at this particular moment of the combined AV data (e.g., satisfied by a ranking of Very Much, Quite A Bit, Moderately, A Little, or Not At All). The first person can then interact with the overlaid graphical user interface and select the first rank 5130 (e.g., Moderately has been selected in FIG. 26A). Examples of different ranks are shown above in FIGS. 10 and 11 and described above. The first mobile device 5126 transmits the first rank 5130 selected by the first user to the computer server via the network.

FIG. 26B shows the second mobile device 5132 displaying the second query statement 5134 during playback of the combined AV data at a specific time during the playback. The second query statement 5134 in this example is a statement directed to how the second person B felt at this particular moment of the combined AV data (e.g., satisfied by a ranking of Very Much, Quite A Bit, Moderately, A Little, or Not At All). The second person can then interact with the overlaid graphical user interface and select the second rank 5136 (e.g., Very Much has been selected in FIG. 26B). Examples of different ranks are shown above in FIGS. 10 and 11 and described above. The second mobile device 5132 transmits the second rank 5136 selected by the second user to the computer server via the network. The example shown in FIGS. 26A and 26B displays the same query statement ("Here I feel Satisfied"). However, the first query statement and the second query statement can differ, as described above and shown in FIGS. 12-16.

FIGS. 27-30 show examples of a mobile device 5200 displaying the combined AV data 5202 created by the computer server and a graphic display 5204 of the comparative rank data which has also been created by the computer server. The combined AV data 5202 and the comparative rank data have been transmitted from the computer server and received by the mobile device 5200. The graphic display 5204 of the comparative rank data can be created by the mobile device 5200, the computer server or both. The graphic display 5204 can be similar to the graphic display 1700, 1800, 1900, 2000 shown in FIGS. 17-20. Accordingly, the graphic display 1700, 1800, 1900, 2000 shown in FIGS. 17-20 can be displayed on the mobile device 5200.

Figure 27:
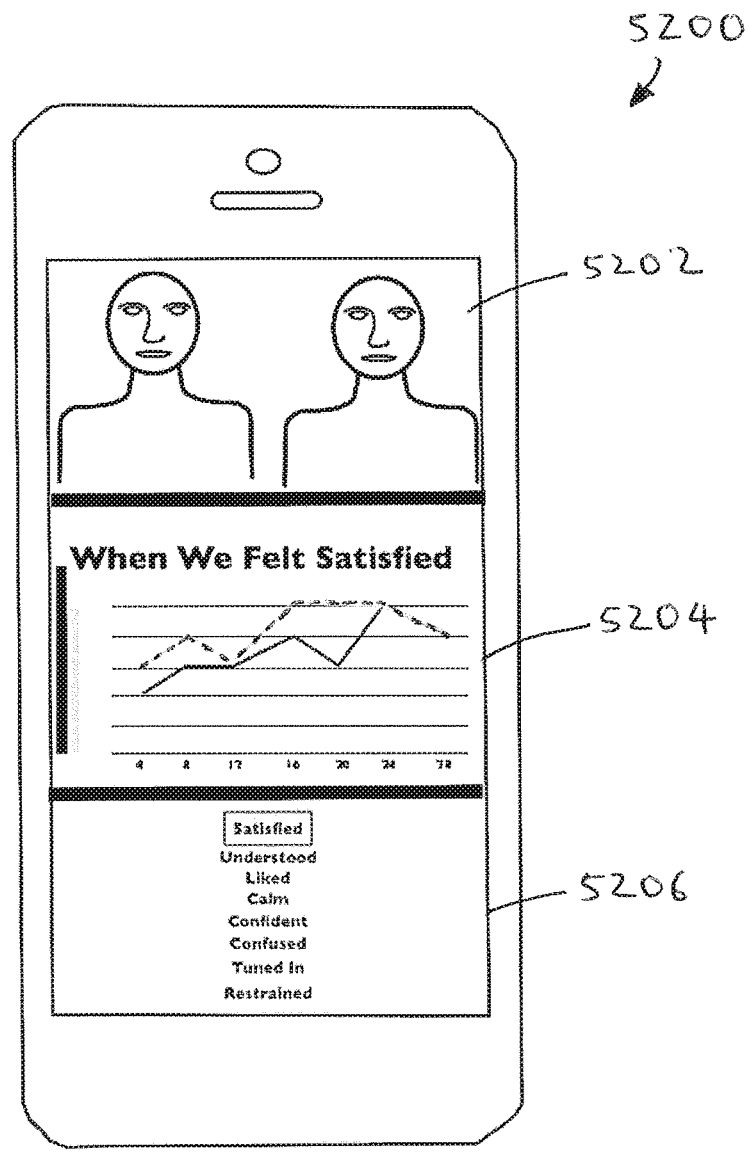
FIG. 27 shows a mobile device displaying an embodiment of a user interface.

FIG. 27 shows a field display 5206 as a part of the graphic display 5204 of the user interface. The field display 5206 displays a list of terms that are associated with the comparative rank data. The field display 5206 shows, for example, that the "Satisfied" item has been selected, which then displays in the graphic display 5204 the comparative data associated with the "Satisfied" rankings between the first and second persons. The graph display 5204 can help participants to look back at their face-to-face interaction in an empirical way, allowing the first and second persons to see for themselves how they connected at a moment or moments in time of that face-to-face interaction. This process is at the core of learning, discovery learning rather than performance learning.

Figure 28:
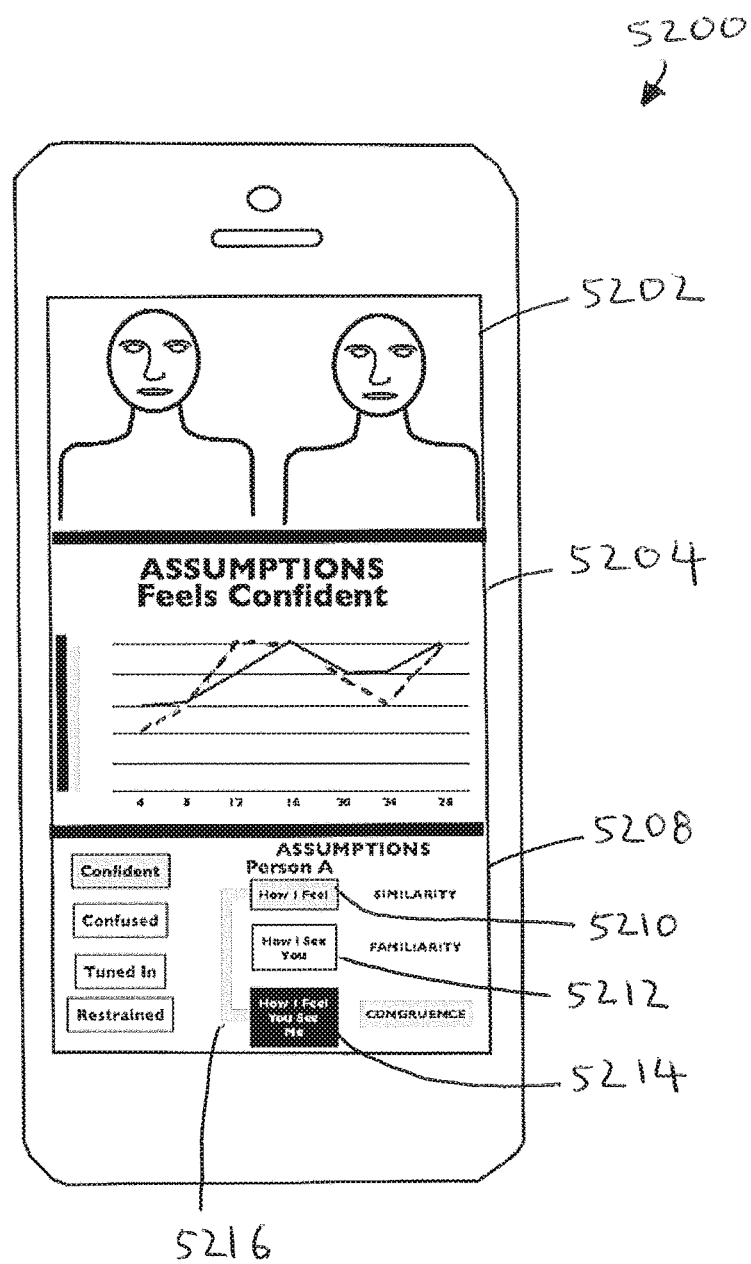
FIG. 28 shows a mobile device displaying an embodiment of a user interface.

The mobile device 5200 in FIG. 28 shows another field display 5208 instead of the field display 5206 shown in FIG. 27. The field display 5208 is similar to the three viewpoints described above and shown in FIG. 14. The three viewpoints are directed to: 1) Self-View 5210 ("How I Feel"), 2) Other-View 5212 ("How I See You"), and 3) Social-View 5214 ("How I Feel You See Me"). The comparative rank data can be displayed as an association between any two of the three viewpoints 5210, 5212, 5214 of individual perspectives (for each of the first and second persons). When any two of the three viewpoints 5210, 5212, 5214 are selected, the connecting link 5216 is displayed. The graphic display 5204 displays the associated comparative rank data of the selected two of the three viewpoints 5210, 5212, 5214 for each of the first and second persons. For example, the field display 5206 shows that "How I Feel" data of the first person A and "How I Feel You See Me" of the first person A have been selected, which is an assumption of congruence-incongruence (1406 shown in FIG. 14; see also FIG. 15).

Figure 29:
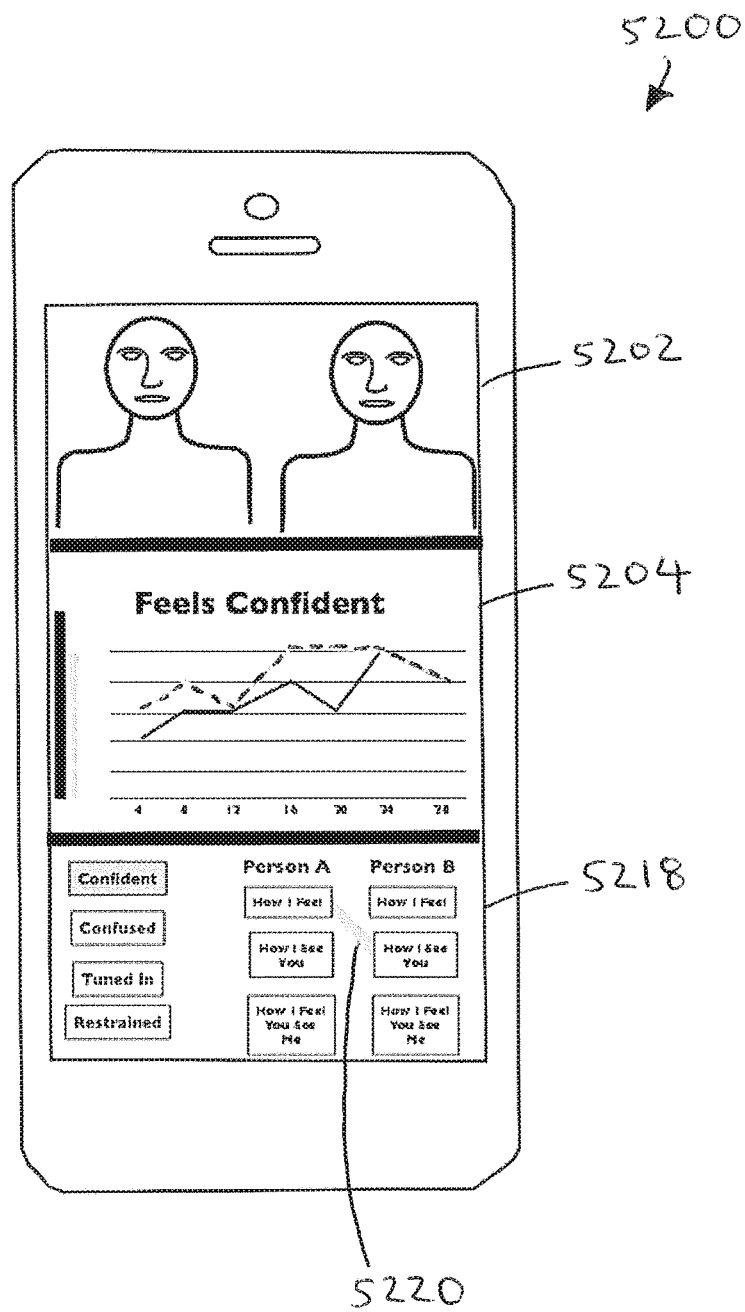
FIG. 29 shows a mobile device displaying an embodiment of a user interface.

The mobile device 5200 in FIG. 29 shows yet another field display 5218, instead of the field display 5206 shown in FIG. 27 or the field display 5208 shown in FIG. 28. The field display 5218 is similar to the comparative of relational assumptions described above and shown in FIGS. 16 and 20. The field display 5218 is selectable such that one or more graphic link 5220 showing the selected comparison of persons' viewpoints that are displayed in the graphic display 5204 is displayed. The selected comparison changes the graphic display 5204 to show the associated quantified statistical values are graphed between recorded data of conversations. The significance of the graphic display 5204 is that it permits the comparative rank data to be realized in a significant way, e.g., a trend can be identified, and the user could then go directly to an individual session for closer analysis of particular stored data (e.g., AV data and the associated data) of specific conversations.

Figure 30:
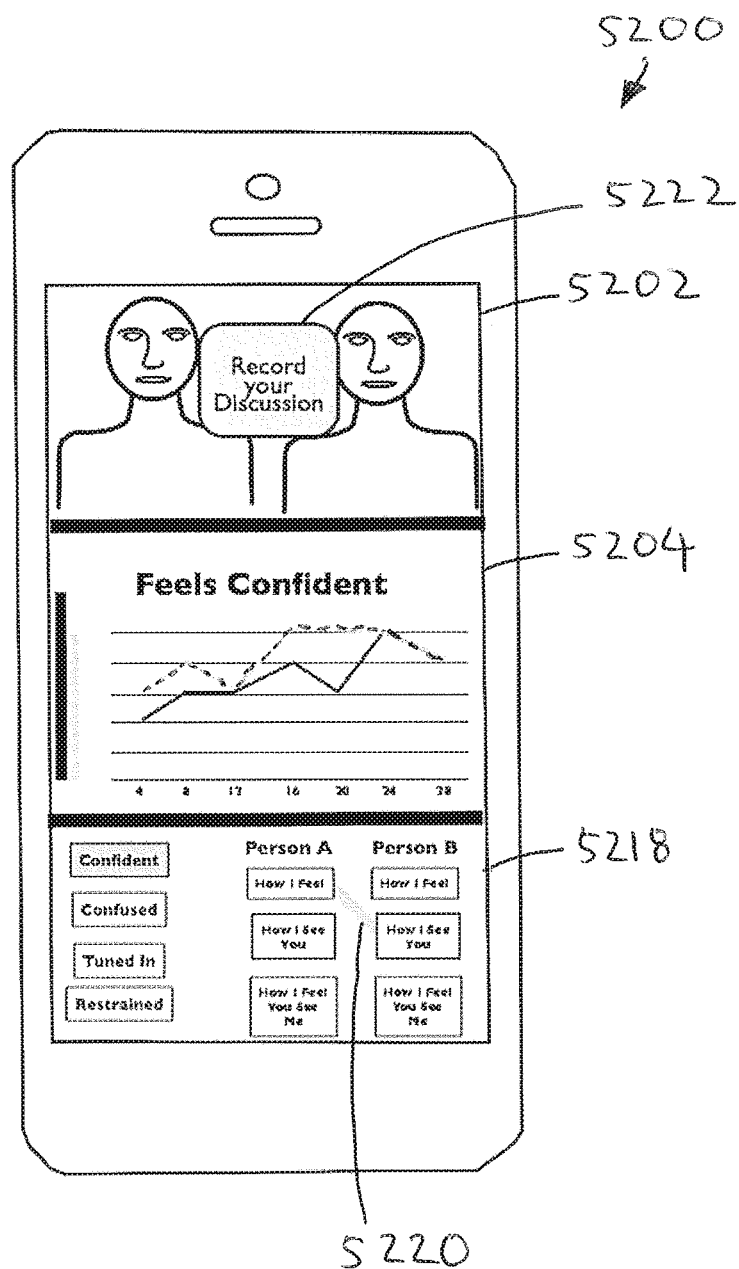
FIG. 30 shows a mobile device displaying an embodiment of a user interface.

FIG. 30 shows the mobile device 5200 which includes a graphic user interface for recording 5222 an additional audio data that is associated with the combined AV data 5202 and the associated comparative rank data (displayed in the graphic display 5204). The additional audio data is transmitted to the computer server and it is associated with the combined AV data, so that the first or the second persons can review (e.g., listen to) the additional audio data on their respective mobile devices on their own accord. This additional feedback can engage the participants in discovering additional information about the face-to-face conversation and/or their relationship on their own initiative.

Figure 31:
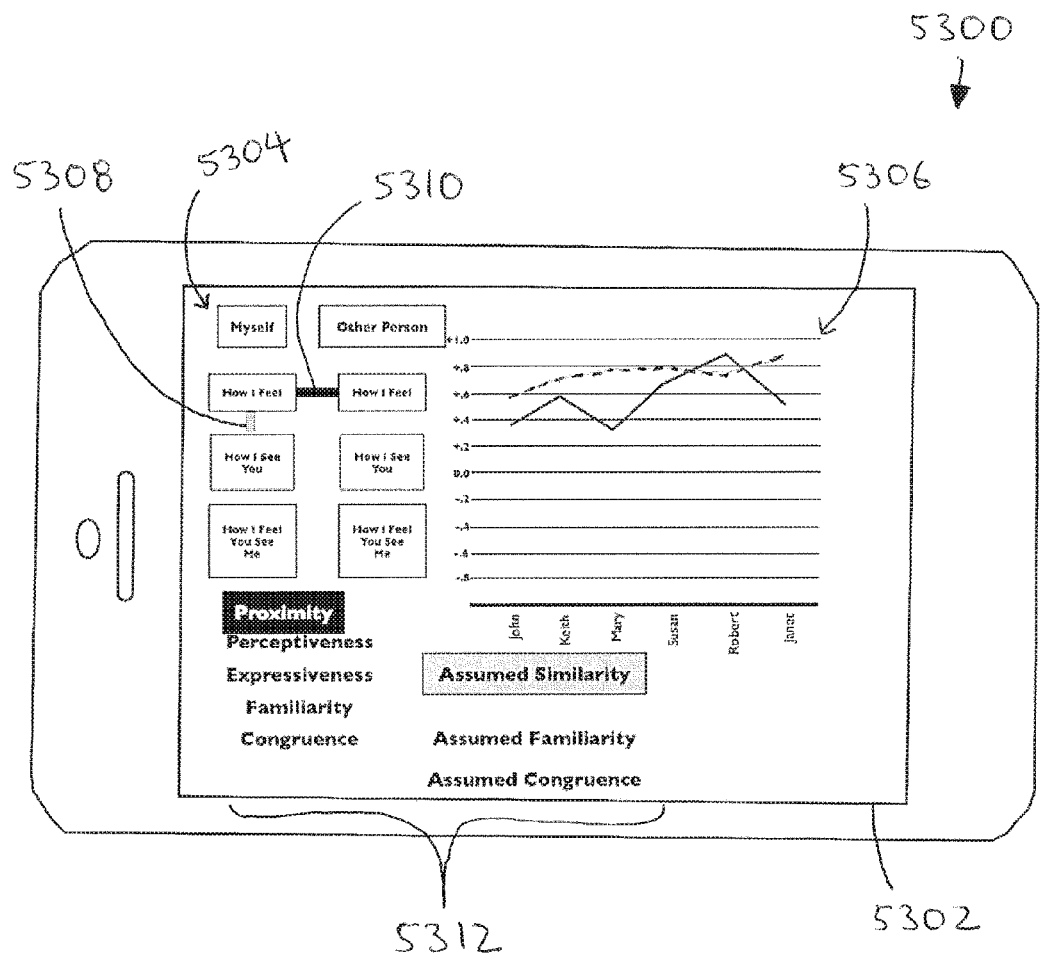
FIG. 31 shows a mobile device displaying an embodiment of a user interface.

FIG. 31 shows another example of a mobile device 5300, which does not display the combined AV data, but does display a graphic display 5302 of the comparative rank data which has also been created by the computer server. The comparative rank data has been transmitted from the computer server and received by the mobile device 5300. The graphic display 5302 of the comparative rank data can be created by the mobile device 5300 once the comparative rank data has been received by the mobile device 5300. The graphic display 5302 can be similar to the graphic display 1700, 1800, 1900, 2000 shown in FIGS. 17-20.

The graphic display 5302 includes a field display 5304 and a graph 5306, both of which can be provided as portions of the user interface (for example, similar to field display 910 and graph 912 shown in FIGS. 9A and 9B). The field display 5304 is selectable such that one or more graphic link 5308, 5310 showing the selected comparison of persons' viewpoints that are displayed in the graph 5306 is displayed. The selected comparison changes the graph 5306 that is displayed to show the associated quantified statistical values are graphed between recorded data of conversations. Further, based on the graphic links selected, a term which identifies the selected graphic links can be displayed and/or highlighted in a term portion 5312 of the graphic display 5302. For example, the selected graphic link 5308 is associated with "Assumed Similarity," which is highlighted and displayed in the term portion 5312. Further, for example, the selected graphic link 5310 is associated with "Proximity," which is highlighted and displayed in the term portion 5312. The terms and their relationships are described above and shown in FIGS. 15 and 16.

Figure 32:
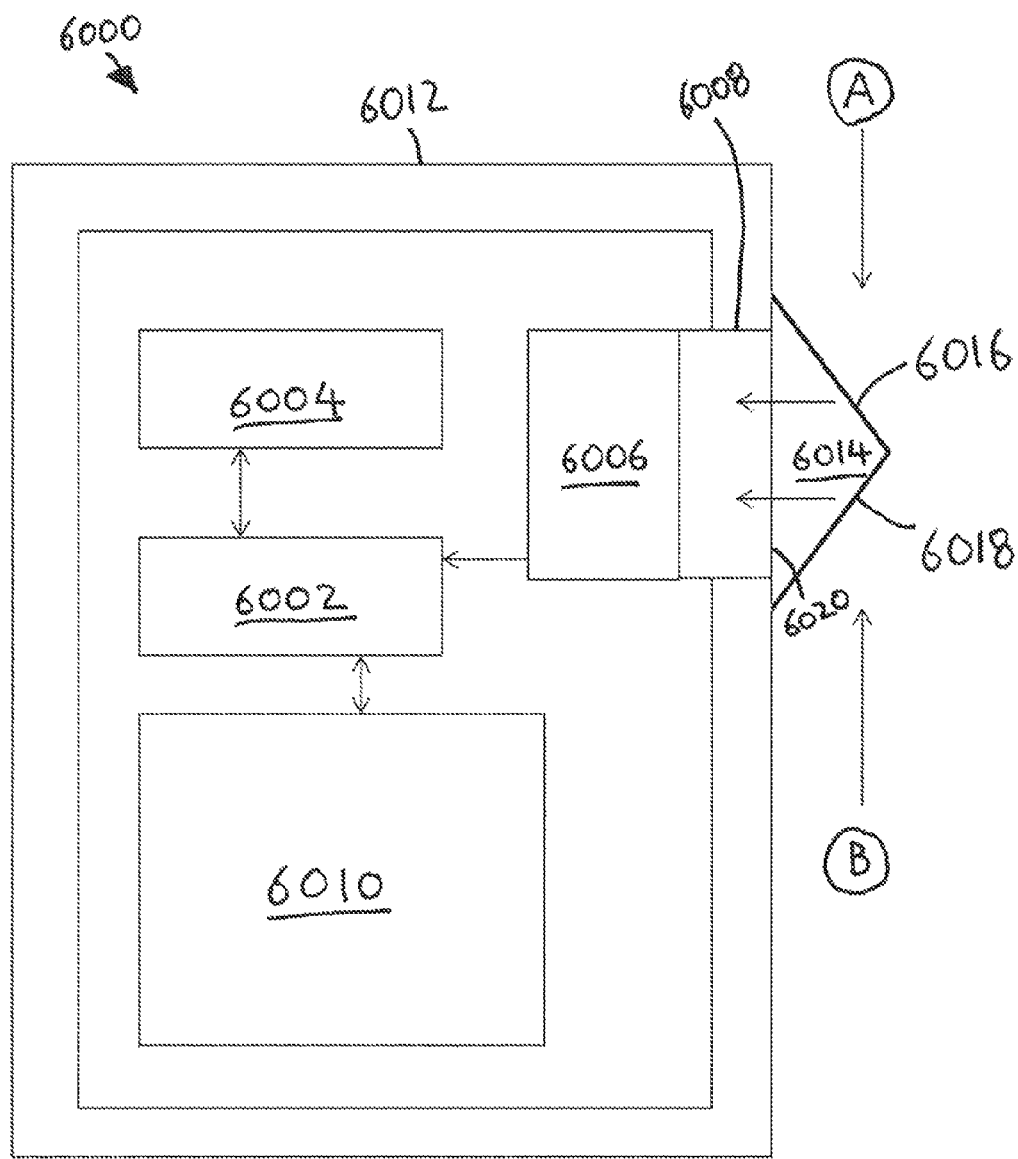
FIG. 32 shows a schematic view of a mobile device according to an embodiment.

FIG. 32 shows schematic view of an embodiment of a mobile device 6000. The mobile device 6000 includes a processor 6002, a non-transitory computer-readable memory 6004, and a camera component 6006. The non-transitory computer-readable memory 6004 and the camera component 6006 are in communication with the processor 6002. The camera component 6006 includes an aperture 6008, and the camera component 6006 is configured to send an image data and/or a video data received via the aperture 6008 to the processor 6002. The mobile device 6000 also includes a display 6010 (e.g., LED, OLED, LCD, a touch screen display, etc.), which is in communication with the processor 6002. The processor 6002 displays the image data and/or the video data on the display 6010. In some embodiments, the display 6010 is a touch screen so that input by a user can be communicated to the processor 6002 by touching the touch screen. The mobile device 6000 has an outer casing 6012 which at least partially covers the mobile device 6000. The casing 6012 includes a prism 6014 positioned to be in front of the aperture 6008. For example, the casing 6012 can have a hole or a transparent window between the prism 6014 and the aperture 6008, so that a part of the prism 6014 is connected to a part of the casing 6012 at a periphery surface portion around and/or near the hole or the transparent window. The prism 6014 has a first surface 6016, a second surface 6018, and an aperture-facing surface 6020. The aperture-facing surface 6020 faces the aperture 6008. A first image from the outside of the prism 6014 is received via the first surface 6016 of the prism 6014, and the first image is directed (i.e., refracted and/or reflected) towards the aperture 6008 by passing through the aperture-facing surface 6020 (e.g., see arrow A). A second image from the outside of the prism 6014 is received via the second surface 6018, and the second image is directed (i.e., refracted and/or reflected) towards the aperture 6008 by passing through the aperture-facing surface 6020 (e.g., see arrow B). Thus the prism 6014 combines the first and second images such that the aperture 6008 receives the combined image. Accordingly, the mobile device 6000 can be used for recording a face-to-face interaction between two people who are sitting apart and facing one another. For example, the first surface 6016 of the prism 6014 can receive a facial image of a first person as the first image. Further, for example, the second surface 6018 of the prism 6014 can receive a facial image of a second person as the second image. Both of the facial images of the first and second persons are combined by the prism 6014 to form a combined image, and then the combined image can be directed to the aperture 6008 of the camera component 6006. The combined image is sent to the processor 6002, and then the combined image can be saved (e.g., stored) in the non-transitory computer-readable memory 6004.

Recording the sound from the face-to-face interaction can be done by the mobile device 6000 via a microphone (not shown). For example, an embodiment of the mobile device is a smart phone. A function of the audio recording is to act as a stimulus for at least one participant's recall of the face-to-face interaction during a recall process described above. Thus, the mobile device 6000 can be used to record a video and audio of a conversation of two participants.

Figure 33A:
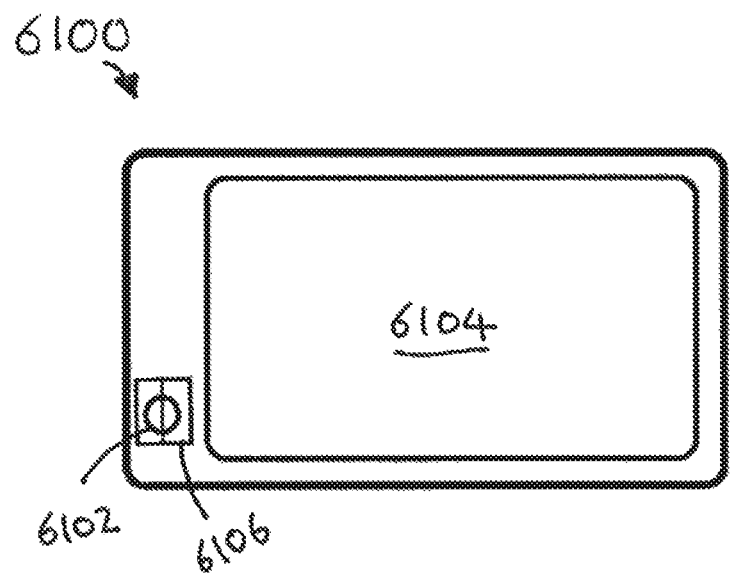
FIGS. 33A and 33B show views of a mobile device according to an embodiment.
Figure 33B:
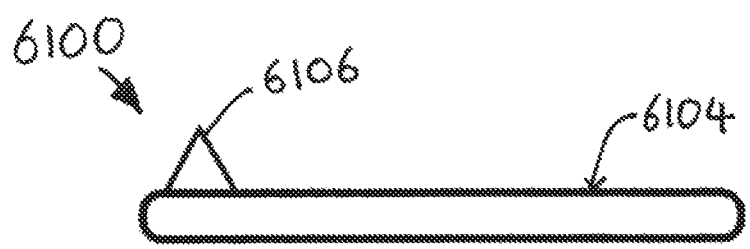

FIG. 33A shows a frontal view, and FIG. 33B shows a side view of an embodiment of the mobile device 6100 (similar to 6000 in FIG. 32). The camera component 6102 is a front-facing camera 6102 of the mobile device 6100, wherein the camera component 6102 faces the same side as the display 6104. The prism 6106 is configured to be positioned in front of the front-facing camera 6102 of the mobile device 6100.

Figure 34A:
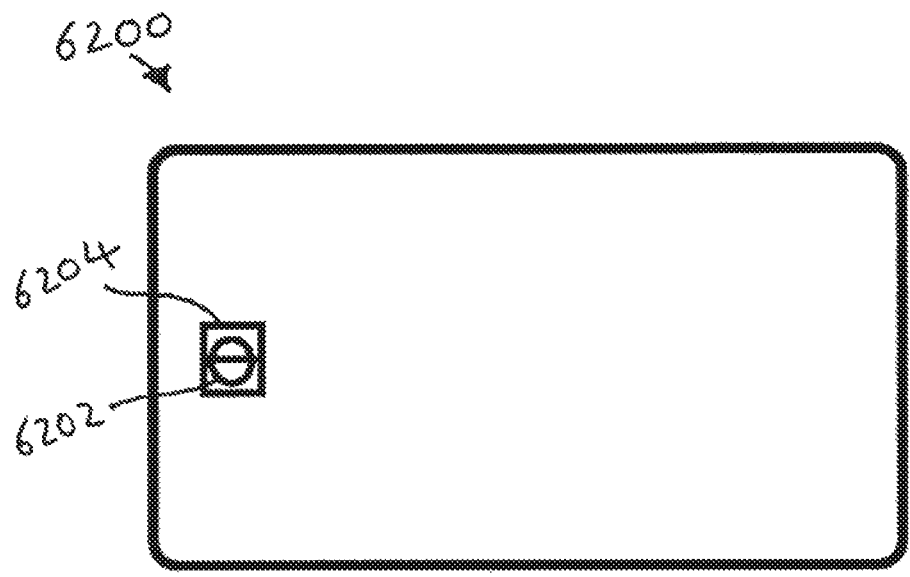
FIGS. 34A and 34B show views of a mobile device according to another embodiment.
Figure 34B:
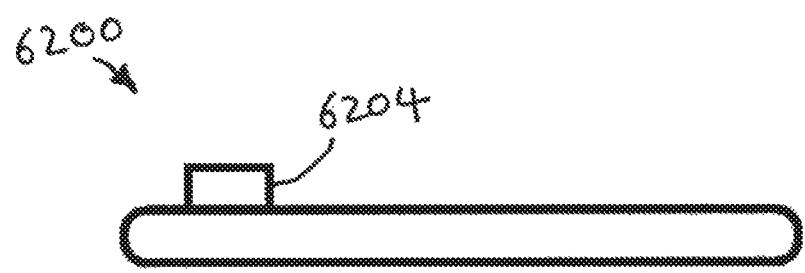

FIG. 34A shows a rear view, and FIG. 34B shows a side view of another embodiment of the mobile device 6200 (similar to 6000 in FIG. 32). The camera component 6202 is a rear-facing camera 6202 of the mobile device 6200, wherein the camera component faces 6202 the opposite side as the display (not shown). The prism 6204 is configured to be positioned in front of the rear-facing camera 6202 of the mobile device 6200.

Any of the prisms shown in FIGS. 33A, 33B, 34A, and 34B can be a part of an accessory for the mobile device. That is, the prism (e.g., 6106, 6204) can be a part of a case for the mobile device, such that the case and the prism can be detached from the mobile device. The prism can be connected to an engagement portion for being connected to the mobile device (e.g., via a frictional engagement, a magnetic engagement, a mechanical engagement, an adhesive engagement, etc.). The engagement portion can also be detachable from the mobile device. When the mobile device is a smart phone, for example, the casing is configured to engage at least a part of an external surface of the smart phone, and the casing has an opening near or at the aperture of the smart phone's camera, and a prism is arranged at the opening so that the prism has an aperture-facing surface that would face the aperture of the smart phone's camera. When the mobile device is an action capturing camera, for example, the casing is configured to securely contain the action capturing camera, and the casing can have a transparent window portion near or at the aperture of the action capturing camera, and a prism is arranged at the opening so that the prism has an aperture-facing surface that would face the aperture of the action capturing camera.

Figure 35:
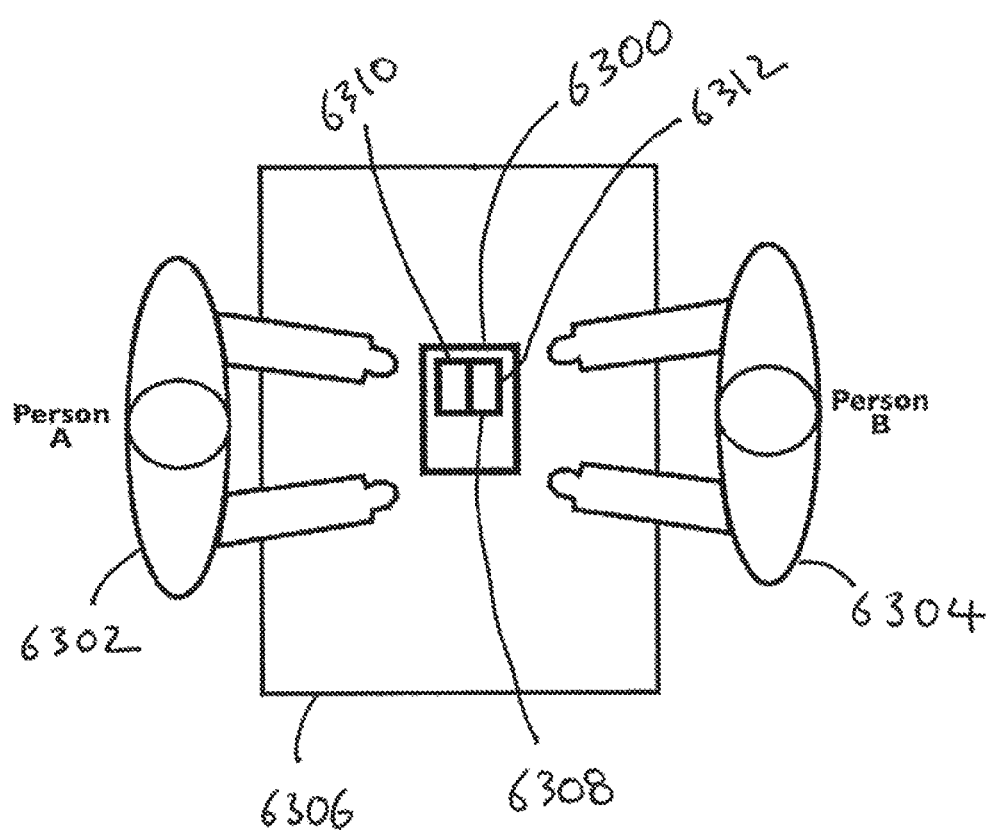
FIG. 35 shows an exemplary method of using a mobile device.

FIG. 35 shows an example method of using the mobile device 6300 (also 6100 shown in FIGS. 33A and 33B, and 6200 shown in FIGS. 34A and 34B) for recording a face-to-face conversation between two participants 6302, 6304. The mobile device 6300 is placed on a flat surface 6306, such as a table, that is placed between the two participants 6302, 6304. The mobile device 6300 is located lower than the height level of the two participants' 6302, 6304 faces. The prism 6308 of the mobile device 6300 is positioned to be facing up. Further, a first surface 6310 of the prism 6308 faces towards the first participant 6302, and a second surface 6312 of the prism 6308 faces towards the second participant 6304.

The prism 6308 has internal angles (along with a geometry, shape, etc.) appropriate for capturing the images of the two participants 6302, 6304 and for directing the images to form a combined image and directing the combined image of the two participants towards an aperture of the camera of the mobile device 6300. Thus, the mobile device 6300 captures the image(s) and/or the video of the face-to-face conversation of the two participants 6302, 6304 without being in the way or blocking the views between the two participants 6302, 6304.

Figure 36:
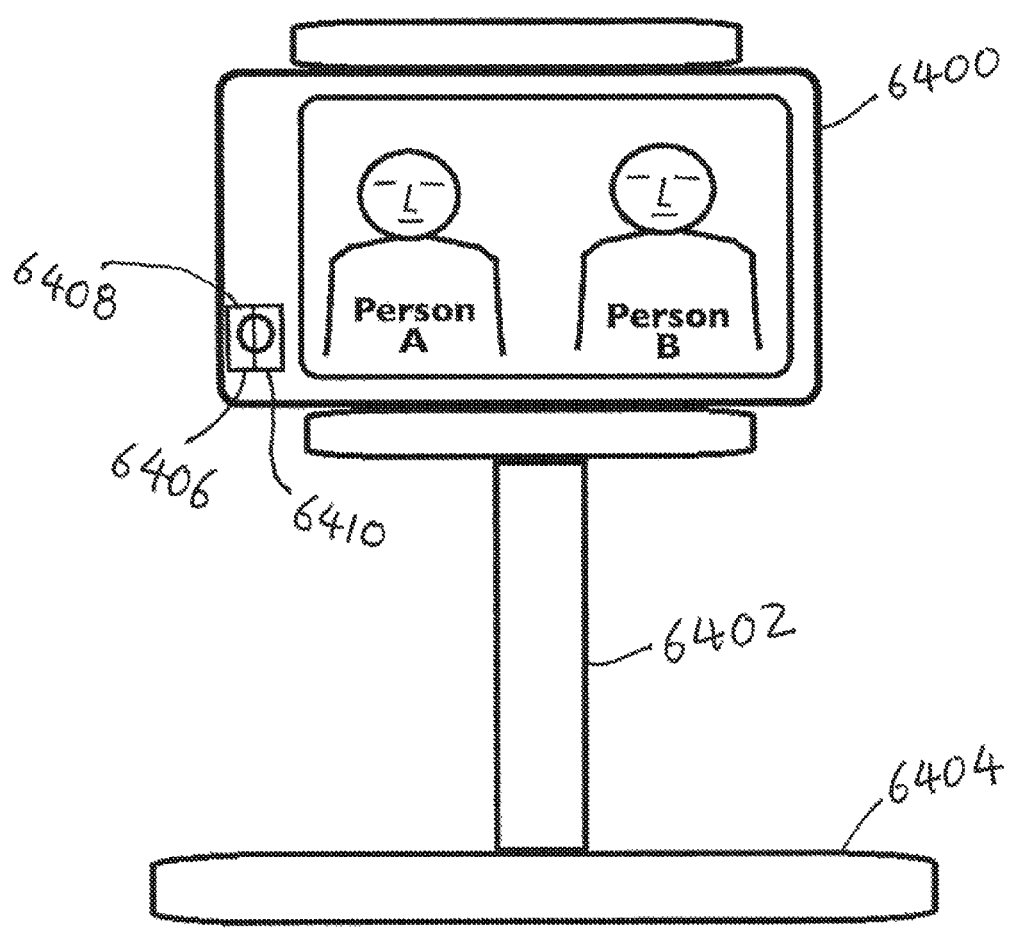
FIG. 36 shows another embodiment of a mobile device.

FIG. 36 shows another embodiment, wherein the mobile device 6400 (also 6100 shown in FIGS. 33A and 33B, and 6200 shown in FIGS. 34A and 34B) can be configured similarly to the camera system 200 shown in FIG. 2. The mobile device 6400 includes and/or is connected to a stand 6402 and a base 6404. The stand 6402 can be a telescoping tube that is configured for changing the height of the mobile device 6400. The prism 6406 of the mobile device 6400 is configured so that a first surface 6408 of the prism 6406 faces towards the first participant (e.g., Person A), and a second surface 6410 of the prism 6406 faces towards the second participant (e.g., Person B).

Figure 37:
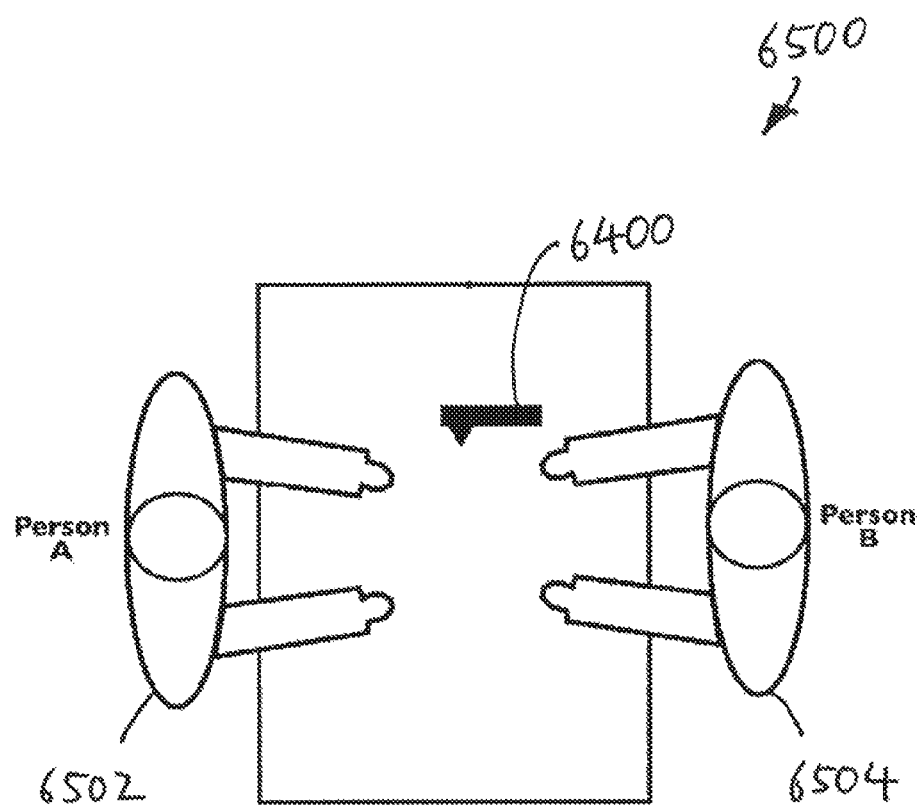
FIG. 37 show an exemplary method of using a mobile device.

FIG. 37 show an example of positioning 6500 for the mobile device 6400 and two participants 6502, 6504. The two participants 6502, 6504 are positioned face-to-face for engaging in a social interaction, e.g., face-to-face interaction. The mobile device 6400 is placed at position that is not in the axis of the interaction defined by the first person's position and second person's position. Yet, the mobile device 6400 can still capture substantially face-on images of the participants 6502, 6504, such that facial expressions of the participants 6502, 6504, such as, eye movement, and/or eye contact between the participants can be recorded. Such information replicates what was available in the face-to-face interaction and stimulates greater recall for the participants.

Figure 38:
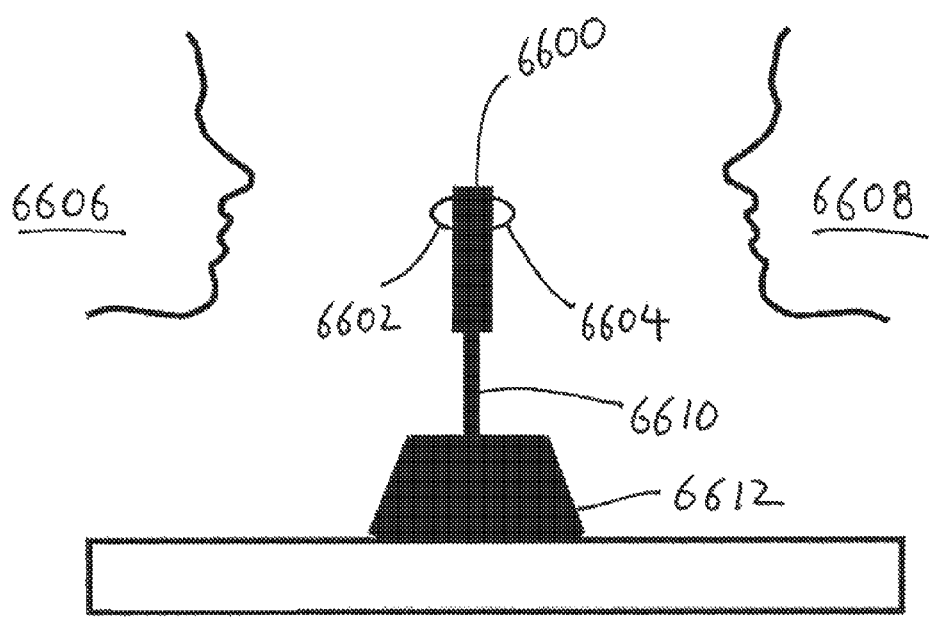
FIG. 38 show another embodiment of a mobile device.

FIG. 38 show an example of another embodiment, in which, the mobile device 6600 includes two cameras 6602, 6604. The first camera 6602 is on a front side of the mobile device 6600. The second camera 6604 is on a rear side of the mobile device. The mobile device includes a processor executing computer-executable instructions for staring both of the cameras 6602, 6604, and then the processor combines image(s) and/or video from both of the cameras 6602, 6604 to generate a combined image images(s) and/or video. The mobile device 6600 in this embodiment is positioned between the two participants 6606, 6608 in order for each of the cameras 6602, 6604 to respectively capture substantially face-on image(s) of the participants 6602, 6604. The mobile device 6600 includes and/or is connected to a stand 6610 and a base 6612. The stand 6610 can be a telescoping tube that is configured for changing the height of the mobile device 6600.

Figure 39A:
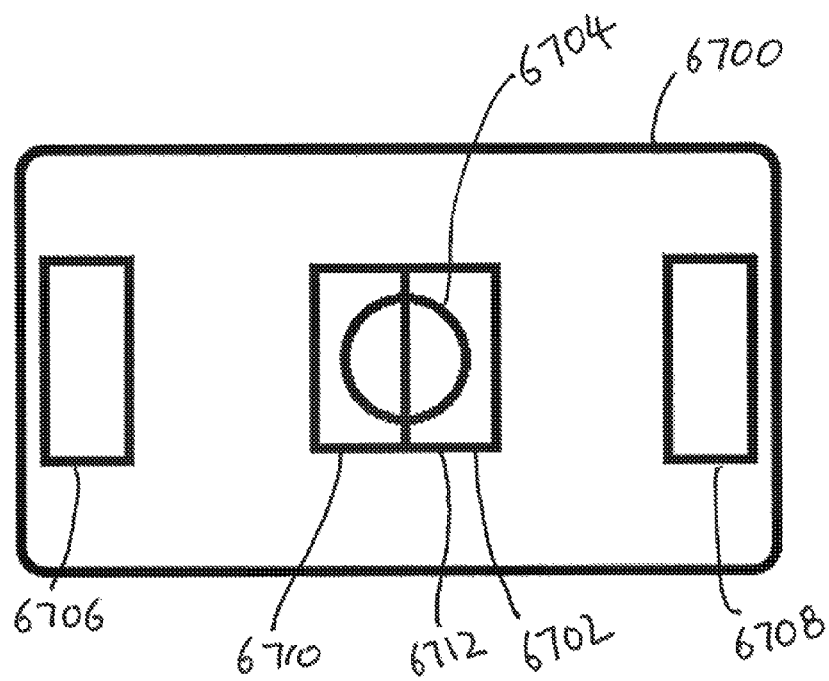
FIGS. 39A, 39B, and 40 show views of another embodiment of the mobile device.
Figure 39B:
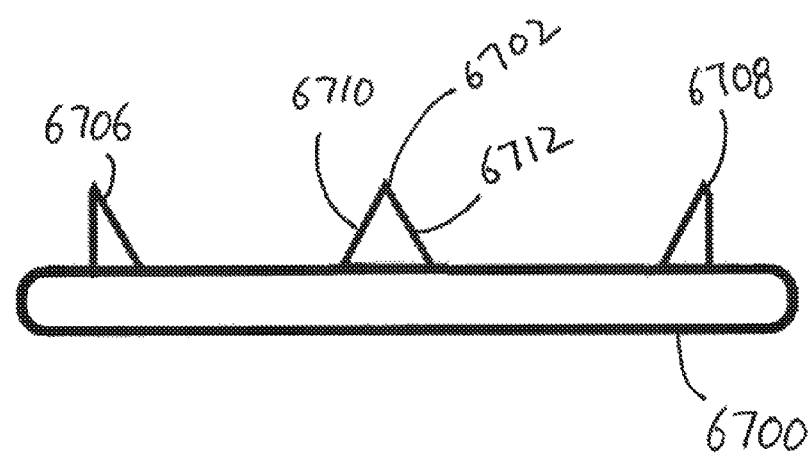
Figure 40:
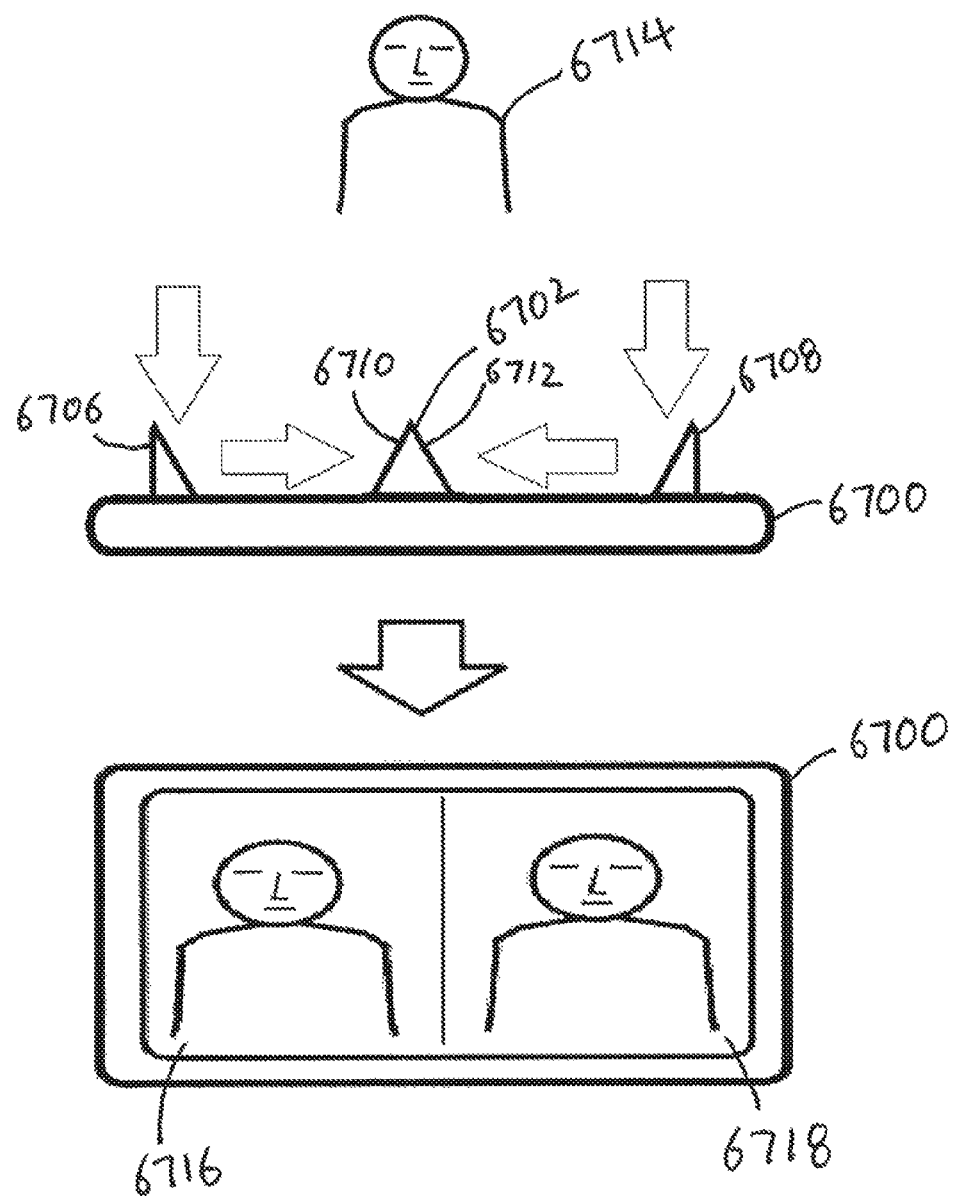

FIGS. 39A, 39B, and 40 show another embodiment of the mobile device 6700, having a prism 6702 positioned in front of an aperture of a camera component 6704. FIG. 39A shows a front view of the mobile device 6700. FIG. 39B shows a top plan view of the mobile device 6700. The mobile device 6700 includes two additional reflectors 6706, 6708 (e.g., prisms, mirrors, reflective devices, etc.). The first reflector 6706 is positioned along an optical path for directing image(s) from an object in front of the camera component 6704 of the mobile device 6700 towards a first surface 6710 of the prism 6702. The second reflector 6708 is positioned along a second optical path for directing image(s) from the object in front of the camera component 6704 of the mobile device 6700 towards a second surface 6712 of the prism 6702. This configuration of the two reflectors 6706, 6708 and the prism 6702 creates a combined image of the object, such that the image(s) and/or video captured by the mobile device 6700 can include stereoscopic aspects. That is, the image(s) and/or video captured by the mobile device 6700 can be viewed using a virtual reality display unit and the viewer can experience a fully three-dimensional stereoscopic experience.

FIG. 40 shows the top plan view of the mobile device 6700 being operated for capturing image(s) and/or video of a subject 6714 (e.g., a person). The first reflector 6706 reflects a first image of the subject 6714 and directs the first image towards the first surface 6710 of the prism 6702. The second reflector 6708 reflects a second image of the subject 6714 and directs the second image towards the second surface 6712 of the prism 6702. Because the first reflector 6706 and the second reflector 6708 are spaced apart along a width direction, the first image and the second image are slightly different (e.g., they are views from different angles of the subject 6714). The prism 6702 combines the two images and a combined image is directed towards the camera of the mobile device 6700. The mobile device 6700 can record the combined images to a non-transitory computer-readable memory, and the data of the recorded combined images can be played back as shown, wherein the displayed images have a left image 6716 and a right image 6718 that respectfully match the first image and the second image of the subject 6714. Accordingly, when the combined images are viewed using a virtual reality display unit, the viewer can have a fully three-dimensional virtual viewing experience.

Further, in order to create the combined images and/or combined video having the left image 6716 and the right image 6718 so that the viewer will have the three-dimensional virtual viewing experience, the combined image that the camera receives from the prism 6702 may require further processing performed by a processor of the mobile device 6700. The processor can execute computer-executable instructions that are stored in the non-transitory memory, wherein one or more of the left image 6716 and the right image 6718 are generated from the combined image received by the camera from the prism by transposing, inverting, rotating, and/or altering portions of the combined image. The left image 6716 and/or the right image 6718 that are generated by the processor provides each of the viewer's left eye and the viewer's right eye to view the correct images in order to have the three-dimensional virtual viewing experience, by using a virtual reality display unit (e.g., worn on the head of the viewer over the eyes, wherein the left eye sees only the left image 6716, and the right eye sees only the right image 6718).

For example, the processor can generate a modified image from the combined image, wherein the modified image includes a rearrangement of the left image 6716 and the right image 6718. The rearrangement can be, for example, changing the positions of the left image 6716 and the right image 6718 so that the left image 6716 is moved to the right side, and the right image 6718 is moved to the left side on the display. The rearrangement can be, for example, one or both of the left image 6716 and the right image 6718 being rotated about its center, being inverted, flipped horizontally, flipped vertically, or any combinations thereof.

An accessory casing for the mobile device which includes the prism and the two reflectors arranged in this manner can be an effective solution for mobile devices to be able to capture three-dimensional images and/or video.

ASPECTS

Aspect 1. A mobile device, comprising:
 a camera including an aperture; and
 a prism arranged in front of the aperture of the camera, the prism including
  a first surface for receiving a first image which is directed towards the aperture, and
  a second surface for receiving a second image which is directed towards the aperture,
 wherein when the first surface of the prism receives the first image, and the second surface of the prism receives the second image, the prism directs both the first image and the second image toward the aperture, the aperture receives both the first image and the second image, and the camera generates a combined image from both the first image and the second image, wherein the combined image includes a first portion made from the first image, and a second portion made from the second image.

Aspect 2. The mobile device according to aspect 1, wherein the first surface does not receive the second image from outside of the prism, and the second surface does not receive the first image from outside of the prism.

Aspect 3. The mobile device according to any of the aspects 1 to 2, further comprising:
 a processor connected to the camera, wherein the camera transmits the combined image to the processor, and the processor receives the combined image; and
 a non-transitory computer readable memory connected to the processor, wherein the processor stores the combined image to the non-transitory computer readable memory.

Aspect 4. The mobile device according to aspect 3, further comprising a display screen connected to the processor for displaying the combined image.

Aspect 5. The mobile device according to any of the aspects 3 to 4, wherein the combined image is a part of a video.

Aspect 6. The mobile device according to any of the aspects 3 to 5, wherein the processor generates a modified image from the combined image, wherein the modified image includes a rearrangement of the first portion, the second portion, or both the first portion and the second portion of the combined image.

Aspect 7. The mobile device according to aspect 6, wherein the rearrangement includes the positions of the first portion and the second portion being swapped with respective positions of the first portion and the second portion in the combined image.

Aspect 8. The mobile device according to any of the aspects 6 to 7, wherein the rearrangement includes the first portion being rotated about a center of the first portion.

Aspect 9. The mobile device according to any of the aspects 6 to 8, wherein the rearrangement includes the second portion being rotated about a center of the second portion.

Aspect 10. The mobile device according to aspect 3, further comprising a display touch screen connected to the processor for displaying the combined image,
 wherein the processor executes computer-executable instructions for displaying a first query statement on the display touch screen, and allows an input of a first rank to the first query statement via the display touch screen,
 the processor receives the input of the first rank,
 the processor stores the first rank as a part of a comparative rank data in the non-transitory computer readable memory, and
 the processor is configured to display the comparative rank data as a function of time on the display touch screen.

Aspect 11. A device for being connected to a mobile device that includes a camera, comprising:
 a prism including a first surface, a second surface, and an aperture-facing surface, wherein the prism directs both a first image received onto the first surface and a second image received onto the second surface toward the aperture-facing surface and outward from the prism; and
 an engagement portion for connecting to the mobile device for positioning the prism in front of an aperture of the camera of the mobile device, wherein the aperture-facing surface of the prism is positioned to face the aperture of the camera of the mobile device when connected.

Aspect 12. The device according to aspect 11, further comprising a protective cover portion for protecting at least a part of the mobile device.

Aspect 13. The device according to any of the aspects 11 to 12, further comprising a telescoping tube connected to the engagement portion.

Aspect 14. The device according to any of the aspects 11 to 13, further comprising a base connected to a bottom portion of the telescoping tube, wherein the telescoping tube is configured to provide an adjustable distance between the stand and the prism.

Aspect 15. A mobile device, comprising:
 a front side including a display screen and a first camera for receiving a first image;
 a back side including a second camera for receiving a second image;

a processor connected to the first camera and the second camera, wherein the first camera transmits the first image to the processor, the second camera transmits the second image to the processor, and the processor receives the first image and the second image and combines the first image and the second image to generate a combined image, wherein the combined image includes a first portion made from the first image, and a second portion made from the second image; and a non-transitory computer readable memory connected to the processor, wherein the processor stores the combined image to the non-transitory computer readable memory, wherein the processor transmits the combined image to the display screen for displaying the combined image.

Aspect 16. The mobile device according to aspect 15, further comprising:

a second display screen on the back side, wherein the processor transmits the combined image to the second display screen for displaying the combined image.

Aspect 17. The mobile device according to any of the aspects 15 to 16, wherein the combined image is a part of a video.

Aspect 18. The device according to any of the aspects 15 to 17, further comprising a telescoping tube; and a base connected to the telescoping tube, wherein the telescoping tube is configured to provide an adjustable distance between the base and the first camera.

Aspect 19. A personal relationship learning tool for first and second persons, comprising:

a camera system configured to obtain a video data of a face-on first image of the first person and a face-on second image of the second person during a face-to-face conversation between the first and second persons, wherein the face-on first image includes facial expressions and eye movements of the first person, and the face-on second image includes facial expressions and eye movements of the second person;

an audio recording system to obtain audio data of the face-to-face conversation audio of the first and second persons during the face-to-face conversation between the first and second persons;

a computer system connected to the camera system and the audio recording system, that receives the video data and the audio data, combines the video data and the audio data to form an AV (AV) data file, and stores the AV data, wherein the camera system includes a prism arranged in front of an aperture assembly of a camera, the prism including a first surface, a second surface, and an aperture assembly surface, the face-on first image being received at the first surface of the prism and being directed towards the aperture assembly of the camera, the face-on second image being received at the second surface of the prism and being directed towards the aperture assembly of the camera, and the aperture surface facing the aperture assembly of the camera.

Aspect 20. The personal relationship learning tool for first and second persons according to aspect 19, wherein the computer system is configured to aid in analyzing the AV data by playing the AV data, during the playing of the AV data, the computer system providing, at a moment of the AV data, a first query statement to the first person and a second query statement to the second person, the personal relationship learning tool further comprising:

a first ranking device connected to the computer system, which allows the first person to provide a first rank to the first query statement; and a second ranking device connected to the computer system, which allows the second person to provide a second rank to the second query statement, wherein the computer system receives the first rank and the second rank, stores the first rank and the second rank as a comparative rank data, the computer system configured to display the comparative rank data as a function of time of the AV data, which shows periods of similarities and differences of the first rank and the second rank, wherein the periods of similarities and differences are for being observed and discussed becoming points of learning to first and second persons.

While the disclosed learning tool and method have been described in conjunction with a preferred embodiment, it will be obvious to one skilled in the art that other objectives and refinements of the disclosed method, system, and devices may be made within the purview and scope of the disclosure. This disclosure, in its various aspects and disclosed forms, is well adapted to the attainment of the stated objects and advantages of others. The disclosed details are not to be taken as limitations on the claims.

What is claimed is:

1. A personal relationship learning tool for first and second persons, comprising:

a camera system configured to obtain a video data of a face-on first image of the first person and a face-on second image of the second person during a face-to-face conversation between the first and second persons, wherein the face-on first image includes facial expressions and eye movements of the first person, and the face-on second image includes facial expressions and eye movements of the second person;

an audio recording system to obtain audio data of the face-to-face conversation audio of the first and second persons during the face-to-face conversation between the first and second persons;

a computer system connected to the camera system and the audio recording system, that receives the video data and the audio data, combines the video data and the audio data to form an AV (AV) data file, and stores the AV data, wherein the camera system includes a prism arranged in front of an aperture assembly of a camera, the prism including a first surface, a second surface, and an aperture assembly surface, the face-on first image being received at the first surface of the prism and being directed towards the aperture assembly of the camera, the face-on second image being received at the second surface of the prism and being directed towards the aperture assembly of the camera, and the aperture surface facing the aperture assembly of the camera.

2. The personal relationship learning tool for first and second persons according to claim 1, wherein the computer system is configured to aid in analyzing the AV data by playing the AV data, during the playing of the AV data, the computer system providing, at a moment of the AV data, a first query statement to the first person and a second query statement to the second person, the personal relationship learning tool further comprising:

a first ranking device connected to the computer system, which allows the first person to provide a first rank to the first query statement; and a second ranking device connected to the computer system, which allows the second person to provide a second rank to the second query statement, wherein the computer system receives the first rank and the second rank, stores the first rank and the second rank as a comparative rank data, the computer system configured to display the comparative rank data as a function of time of the AV data, which shows periods of similarities and differences of the first rank and the second rank, wherein the periods of similarities and differences are for being observed and discussed becoming points of learning to first and second persons.

\* \* \* \* \*